US012804090B2

(12) United States Patent
Numazaki et al.

(10) Patent No.: US 12,804,090 B2
(45) Date of Patent: Nov. 17, 2026

(54) ATTACHMENT STRUCTURE AND IMAGE FORMATION DEVICE

(71) Applicant: FUJIFILM CORPORATION, Tokyo (JP)

(72) Inventors: Akira Numazaki, Kanagawa (JP); Takahiro Iizuka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 589 days.

(21) Appl. No.: 18/547,685

(22) PCT Filed: Mar. 14, 2022

(86) PCT No.: PCT/JP2022/011447

§ 371 (c)(1),
(2) Date: Aug. 23, 2023

(87) PCT Pub. No.: WO2022/202457

PCT Pub. Date: Sep. 29, 2022

(65) Prior Publication Data

US 2024/0137450 A1 Apr. 25, 2024
US 2024/0236250 A9 Jul. 11, 2024

(30) Foreign Application Priority Data

Mar. 22, 2021 (JP) ................................ 2021-047684

(51) Int. Cl.
*H04N 1/00* (2006.01)

(52) U.S. Cl.
CPC ..... *H04N 1/00588* (2013.01); *H04N 1/00551* (2013.01); *H04N 1/00559* (2013.01)

(58) Field of Classification Search
CPC ........... H04N 1/00559; H04N 1/00551; H04N 1/00588
See application file for complete search history.

(56) References Cited

U.S. PATENT DOCUMENTS

2019/0092078 A1* 3/2019 Hasegawa .......... H04N 1/00588
2022/0060594 A1* 2/2022 Ogawa ............... H04N 1/00554
2022/0094815 A1* 3/2022 Heishi ................ H04N 1/00806

FOREIGN PATENT DOCUMENTS

JP 2007-328204 A 12/2007
JP 2009-260648 A 11/2009
(Continued)

OTHER PUBLICATIONS

English language translation of the following: Office action dated Jan. 7, 2025 from the JPO in a Japanese patent application No. 2021-047684 corresponding to the instant patent application. This office action translation is submitted now in order to supplement the understanding of the cited reference which is being disclosed in the instant Information Disclosure Statement.

*Primary Examiner* — David H Banh
(74) *Attorney, Agent, or Firm* — SOLARIS Intellectual Property Group, PLLC

(57) ABSTRACT

An attachment structure according to the present disclosure includes: a conveyance device provided at a support portion disposed on an upper portion of a recording unit that records an image, the conveyance device conveying an object to be conveyed and reading information; a support portion cover that is provided at an outer surface of the support portion; an upper cover that is provided at an outer surface of the conveyance device and is disposed alongside an upper side of the support portion cover; an attachment member that is attached to a to-be-attached portion disposed inside the support portion, and that positions the support portion cover; and an adjustment portion that adjusts an attachment position of the attachment member to the to-be-attached portion by performing fixing using any one of a plurality of fixing portions that are disposed so as to be staggered in a device width direction.

20 Claims, 18 Drawing Sheets

(56) References Cited

FOREIGN PATENT DOCUMENTS

| | | | |
|---|---|---|---|
| JP | 2010-34958 | A | 2/2010 |
| JP | 2016-114893 | A | 6/2016 |

* cited by examiner

ATTACHMENT STRUCTURE AND IMAGE FORMATION DEVICE

TECHNICAL FIELD

The present disclosure relates to an attachment structure and an image formation device.

BACKGROUND ART

For example, Japanese Patent Application Laid-Open (JP-A) No. 2010-34958 discloses an image formation device including an image reading unit and a position adjustment mechanism of the image reading unit, in which an exterior cover that covers the whole or a part of the adjustment mechanism is fixed to a moving adjustment member included in the adjustment mechanism, and the cover can follow the moving adjustment member.

SUMMARY OF INVENTION

Technical Problem

Objects of the disclosure are to obtain an attachment structure and an image formation device that facilitate an adjustment operation of positional misalignment of a support portion cover and an upper cover in a device width or depth direction as compared with a case where an attachment position of an attachment member to a frame is adjusted and fixed by an adjustment portion using one long hole.

Solution to Problem

An attachment structure according to a first aspect includes: a conveyance device provided at a support portion disposed on an upper portion of a recording unit that records an image, the conveyance device conveying an object to be conveyed and reading information; a support portion cover that is provided at an outer surface of the support portion; an upper cover that is provided at an outer surface of the conveyance device and is disposed alongside an upper side of the support portion cover; an attachment member that is attached to a to-be-attached portion disposed inside the support portion, and that positions the support portion cover; and an adjustment portion that adjusts an attachment position of the attachment member to the to-be-attached portion by performing fixing using any one of a plurality of fixing portions that are disposed so as to be staggered in a device width direction.

In the attachment structure of a second aspect according to the attachment structure of the first aspect, the plurality of fixing portions have: a plurality of holes that are provided at the to-be-attached portion and are arranged at intervals in a device depth direction, the plurality of holes being misaligned, by a distance smaller than a diameter of the holes, in the device width direction; and an insertion element that is inserted into one of the plurality of holes to fix the attachment member.

In the attachment structure of a third aspect according to the attachment structure of the first aspect, the plurality of fixing portions have: a plurality of through-holes that are provided at the attachment member and are arranged at intervals in a device depth direction, the plurality of through-holes being misaligned, by a distance smaller than a diameter of the through-holes, in the device width direction; and an insertion element that penetrates one of the plurality of through-holes and is inserted, in the device depth direction, into one of a plurality of holes provided at the to-be-attached portion to fix the attachment member.

In the attachment structure of a fourth aspect according to the attachment structure of any one of the first to third aspects, the support portion cover is divided into an outer cover that covers a part of a device front surface and an outer side in the device width direction, and an inner cover that is disposed further toward an inner side in the device width direction than the outer cover.

In the attachment structure of a fifth aspect according to the attachment structure of the fourth aspect, the inner cover is positioned at the attachment member, and the outer cover is positioned at the inner cover, and a rigidity of the inner cover is higher than a rigidity of the outer cover.

In the attachment structure of a sixth aspect according to the attachment structure of the fifth aspect, a position at which the outer cover is fixed to a main body portion of the support portion is covered by the upper cover in a state in which an upper surface of the support portion is covered by the conveyance device.

In the attachment structure of a seventh aspect according to the attachment structure of the fourth aspect, the outer cover is positioned at the attachment member, and the inner cover is positioned at the outer cover, and a rigidity of the outer cover is higher than a rigidity of the inner cover.

In the attachment structure of an eighth aspect according to the attachment structure of the seventh aspect, a position at which the inner cover is fixed to a main body portion of the support portion is covered by the upper cover in a state in which an upper surface of the support portion is covered by the conveyance device.

In the attachment structure of a ninth aspect according to the attachment structure of any one of the first to eighth aspects, at least one of the inner cover of the support portion or the outer cover of the support portion cover does not have a rib at least at a back side in a device depth direction of the attachment member.

In the attachment structure of a tenth aspect according to the attachment structure of any one of the first to ninth aspects, a lower side of the support portion cover is positioned at a frame disposed inside the support portion cover.

An attachment structure according to an eleventh aspect includes: a conveyance device provided at a support portion disposed on an upper portion of a recording unit that records an image, the conveyance device conveying an object to be conveyed and reading information; a support portion cover that is provided at an outer surface of the support portion; an upper cover that is provided at an outer surface of the conveyance device and is disposed alongside an upper side of the support portion cover; an attachment member that is attached to a to-be-attached portion disposed inside the support portion, and positions the support portion cover; and an adjustment portion that adjusts an attachment position of the attachment member to the to-be-attached portion by performing fixing using any one of a plurality of fixing portions that are disposed so as to be staggered in a device depth direction.

An image formation device according to a twelfth aspect includes: the attachment structure according to any one of the first to eleventh aspects; a reading unit that reads information on the object to be conveyed which is conveyed by the conveyance device provided at the attachment structure; and an image formation device main body including a recording unit that records information, read by the reading unit, on a recording medium.

Advantageous Effects of Invention

In the attachment structure according to the first aspect, it is easy to perform an adjustment operation of positional misalignment of the support portion cover and the upper cover in the device width or depth direction as compared with a case where an attachment position of an attachment member to a frame is adjusted and fixed by an adjustment portion using one long hole.

In the attachment structure according to the second aspect, positional adjustment can be performed within a range smaller than the diameter of the hole when the attachment member is attached to the to-be-attached portion as compared with the case where the plurality of holes are arranged in the to-be-attached portion in the device width direction.

In the attachment structure according to the third aspect, positional adjustment can be performed within a range smaller than the diameter of the through-hole when the attachment member is attached to the to-be-attached portion as compared with the case where the plurality of through-holes are arranged in the attachment member in the device width direction.

In the attachment structure according to the fourth aspect, positions of the outer cover and the inner cover can be accurately adjusted according to an adjustment position of the attachment member as compared with the case where the support portion cover is integrally formed.

In the attachment structure according to the fifth aspect, it is easy to adjust a position of a boundary area between the outer cover and the inner cover as compared with the case where both the outer cover and the inner cover are positioned at the attachment member.

In the attachment structure according to the sixth aspect, it is possible to place distortion of the outer cover in a region that is unlikely to be seen from outside as compared with the case where a position where the outer cover is fixed to the main body portion is exposed to the outside of the upper cover.

In the attachment structure according to the seventh aspect, it is easy to adjust a position of a boundary area between the outer cover and the inner cover as compared with the case where both the outer cover and the inner cover are positioned at the attachment member.

In the attachment structure according to the eighth aspect, it is possible to place the distortion of the inner cover in a region that is unlikely to be seen from outside as compared with the case where a position where the inner cover is fixed to the main body portion is exposed to the outside of the upper cover.

In the attachment structure according to the ninth aspect, an adjustment allowance of the position of the attachment member can be increased as compared with the case where the rib is provided at the inner cover or the outer cover on a back side in the device depth direction of the attachment member.

In the attachment structure according to the tenth aspect, an upper side of the support portion cover can be deformed to be positioned at the attachment member with a lower side of the support portion cover as a fulcrum.

In the attachment structure according to the eleventh aspect, it is easy to perform an adjustment operation of positional misalignment of the support portion cover and the upper cover in the device width or depth direction as compared with a case where an attachment position of an attachment member to a frame is adjusted and fixed by an adjustment portion using one long hole.

In the image formation device according to the twelfth aspect, it is easy to perform an adjustment operation of positional misalignment of the support portion cover and the upper cover in the device width or depth direction as compared with a case where an attachment position of an attachment member to a frame is adjusted and fixed by an adjustment portion using one long hole.

DESCRIPTION OF EMBODIMENTS

Figure 1:
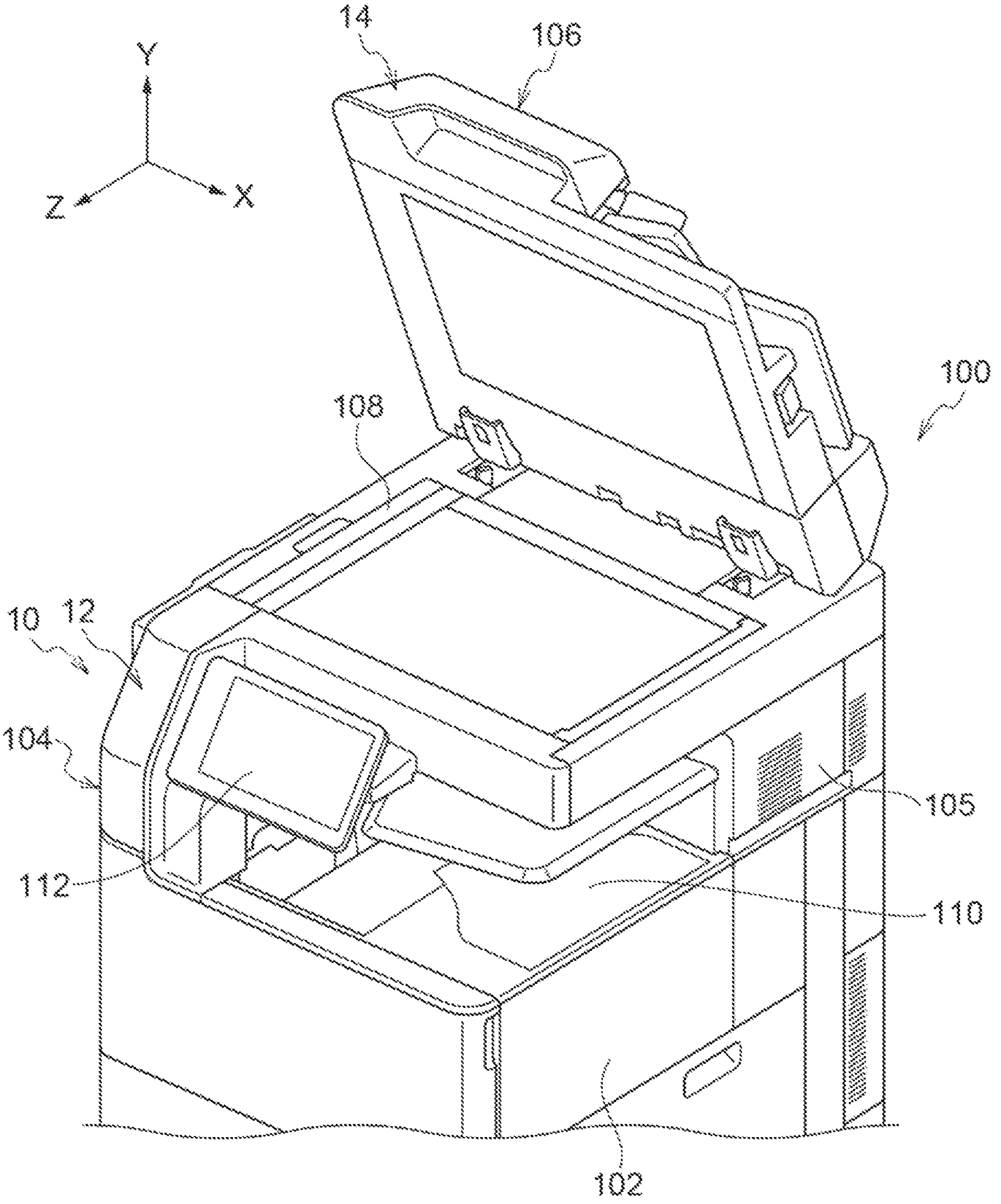
FIG. 1 is a perspective view showing an example of an image formation device including an attachment structure according to a first embodiment and is a view showing a state in which a conveyance device is rotated upward with respect to an image formation device main body.

Hereinafter, embodiments of a technology of the disclosure will be described. In the following description, a direction represented by an arrow X appropriately shown in the drawings is defined as a device width direction, and a direction represented by an arrow Y is defined as a device height direction. In addition, a direction orthogonal to each of the device width direction and the device height direction (that is, an arrow Z direction) is defined as a device depth direction.

First Embodiment

<Configuration of Image Formation Device>

Figure 2:
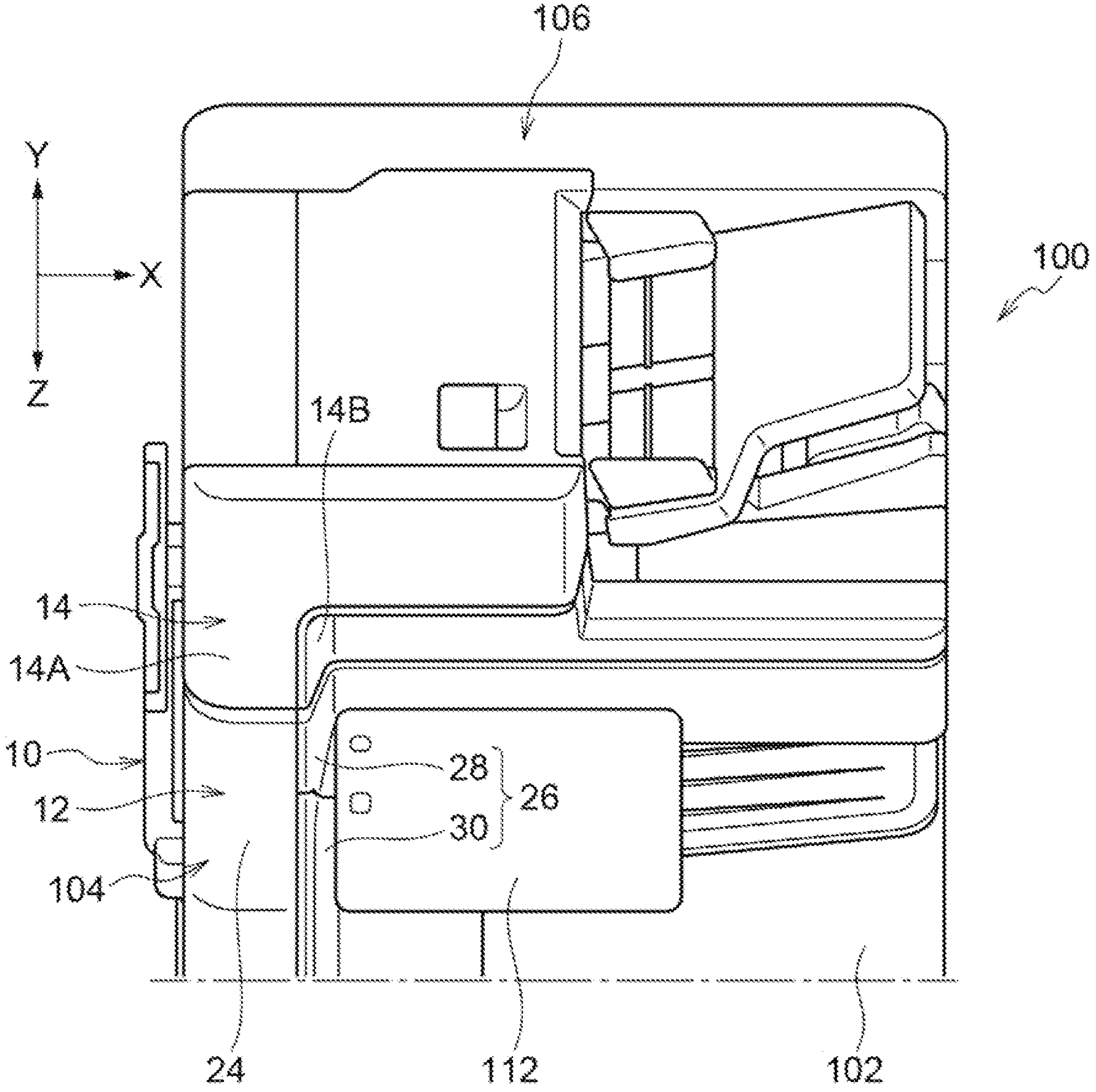
FIG. 2 is a perspective view showing an example of the image formation device including the attachment structure according to the first embodiment and is a view showing a state in which the conveyance device is closed toward the image formation device main body side.

FIGS. 1 and 2 illustrate an example of an image formation device 100 including an attachment structure 10 according to a first embodiment.

As shown in FIGS. 1 and 2, the image formation device 100 includes an image formation device main body 102 including a recording unit that records an image on a recording medium, and a conveyance device 106 disposed via support parts 104 and 105 disposed above the image formation device main body 102. In addition, the image formation device 100 includes a reading unit 108 that reads information of a body to be conveyed (not shown) conveyed by the conveyance device 106. As an example, the reading unit 108 is provided above the support parts 104 and 105.

As an example, the support part (an example of the support portion) 104 is disposed along the device depth direction (that is, the arrow Z direction) on one side (left side in the device width direction as viewed from the front of the device in FIG. 1) in the device width direction (that is, the arrow X direction) of the upper section of the image formation device main body 102. The support part 104 extends in a columnar shape upward from the image formation device main body 102. In addition, the support part (an example of the support portion) 105 is disposed along the device width direction (that is, the arrow X direction) on a back side of in the device depth direction (that is, the arrow Z direction) of the upper section of the image formation device main body 102. The support part 105 extends in a columnar shape upward from the image formation device main body 102. In the first embodiment, the support part 104 and the support part 105 are connected on the back side in the device depth direction.

Although not shown, recording means for recording an image on a recording medium (not shown) and conveyance means for conveying the recording medium on which the image is recorded by the recording means are provided inside the image formation device main body 102. Configurations of the recording means and the conveyance means are not particularly limited. For example, the image formation device main body 102 employs a configuration in which an image is recorded on a recording medium by an electrophotographic method, a configuration in which an image is recorded on a recording medium by an inkjet recording method, or the like.

Between the image formation device main body 102 and the reading unit 108, a discharge unit 110 that discharges a recording medium on which an image is recorded by the image formation device main body 102 is provided on a side of the support part 104. In addition, the image formation device 100 includes an operation unit 112 that performs various operations of the image formation device 100, on a front side of the conveyance device 106 in the device depth direction. In addition, the image formation device 100 includes the attachment structure 10 of the first embodiment.

<Overall Configuration of Attachment Structure>

Figure 3:
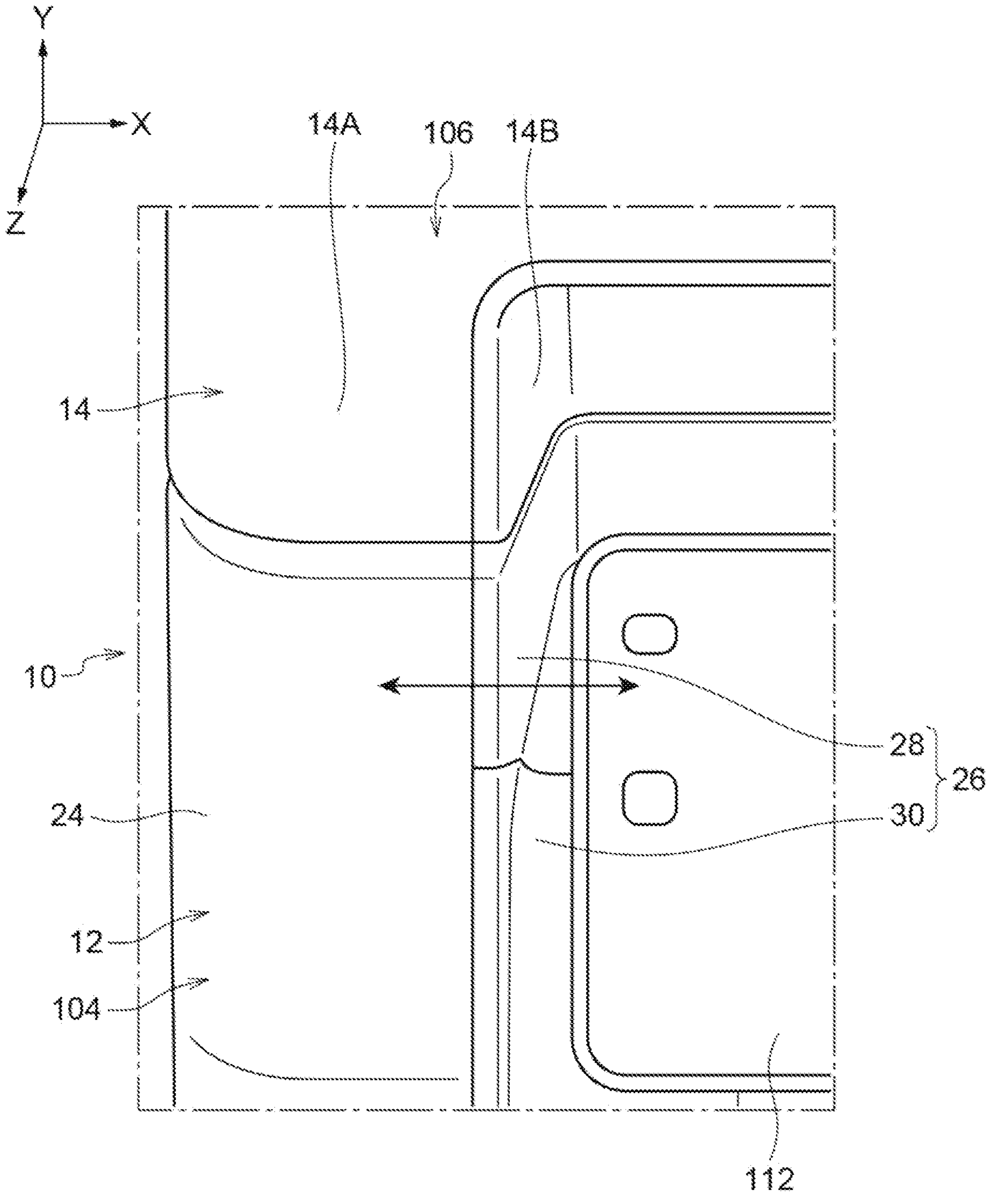
FIG. 3 is an enlarged perspective view of the vicinity of an upper cover and a support part cover in the image formation device including the attachment structure according to the first embodiment.
Figure 4:
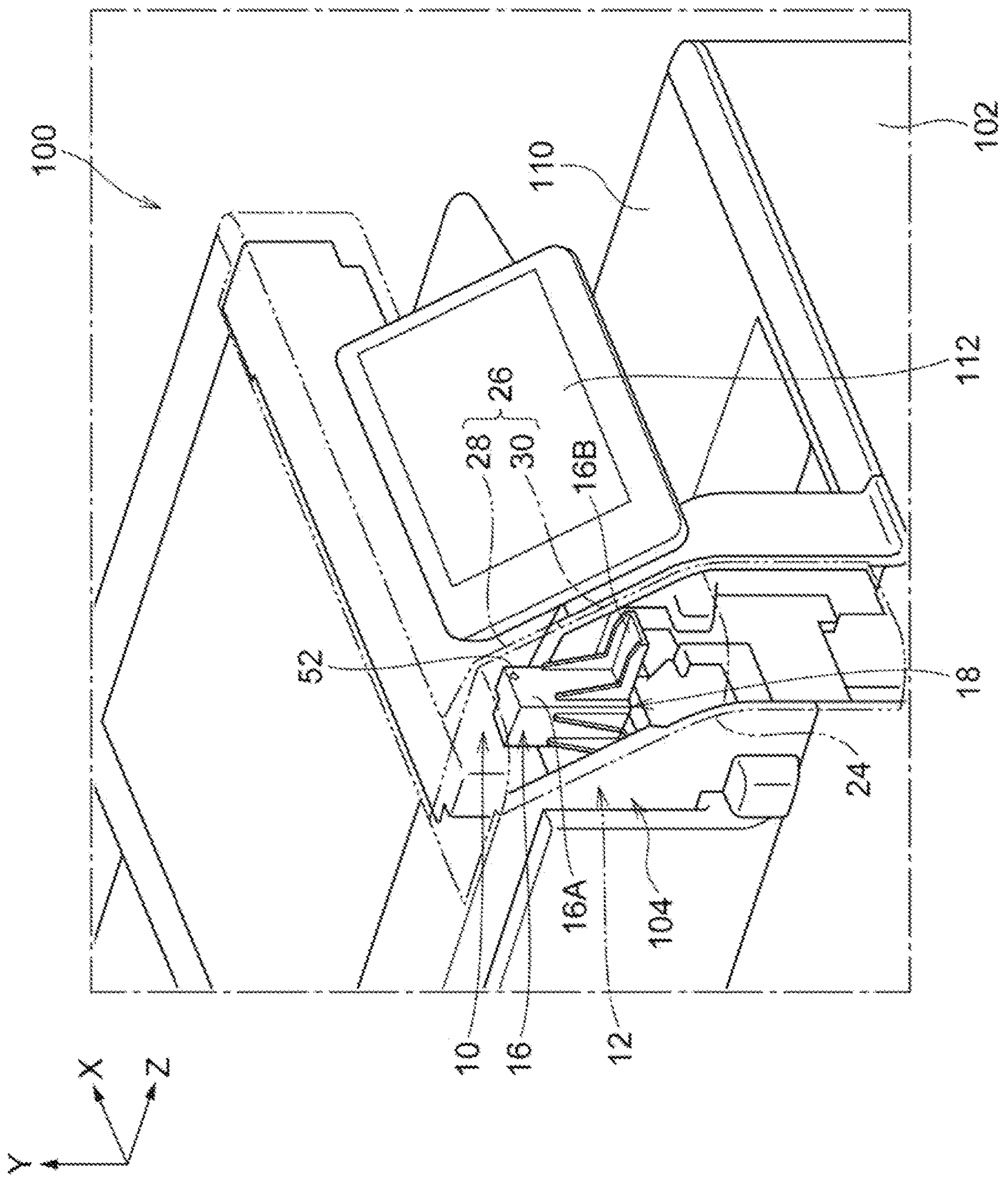
FIG. 4 is a perspective view showing a state in which a bracket disposed inside the support part cover of the attachment structure according to the first embodiment is fixed to a to-be-attached part.

As shown in FIGS. 2 and 3, the attachment structure 10 includes the conveyance device 106, a support part cover 12 provided on an outer surface of the support part 104, and an upper cover 14 provided on an outer surface of the conveyance device 106. In addition, as shown in FIG. 4, the attachment structure 10 includes a bracket 16 that positions the support part cover 12, inside the support part cover 12, and an adjustment part 20 (see FIG. 6) that adjusts an attachment position of the bracket 16 to a to-be-attached part (an example of a to-be-attached portion) 18. The bracket 16 is an example of an attachment member. In addition, another means may be used as long as the position of the support part cover 12 can be adjusted and fixed.

(Conveyance Device)

As shown in FIG. 2, in a front view of the image formation device 100, the conveyance device 106 is disposed above the support part 104. As an example, in the image formation device 100, the conveyance device 106 is rotatably supported with respect to the reading unit 108 above the support part 104 (see FIG. 1). In the first embodiment, the conveyance device 106 is rotatably supported by a hinge (not shown) disposed on the back side of the reading unit 108 in the device depth direction. In other words, the conveyance device 106 is configured to rotate around an axis of the hinge disposed in the device width direction, with respect to the reading unit 108 above the support part 104. That is, the conveyance device 106 moves from a closed state (see FIG. 2) of being in contact with the reading unit 108 to a rotation state in which a front side in the device depth direction rotates upward with respect to the reading unit 108 (see FIG. 1).

(Support Part Cover)

As shown in FIGS. 2 and 3, support part cover 12 covers an outer surface of support part 104. In the first embodiment, the support part cover 12 is divided into an outer cover 24 disposed outside in the device width direction and an inner cover 26 disposed inside in the device width direction from the outer cover 24. In addition, in the first embodiment, the inner cover 26 is divided into an upper inner cover 28 disposed on an upper side in a device vertical direction (that is, the arrow Y direction) and a lower inner cover 30 disposed on a lower side in the device vertical direction from the upper inner cover 28.

The outer cover 24 covers a part of the device front surface of the support part 104 and a side surface of the support part 104 on the outer side in the device width direction. The outer cover 24 is disposed in the vertical direction and is integrally formed in the vertical direction.

The upper inner cover 28 and the lower inner cover 30 constituting the inner cover 26 are disposed in the vertical direction. The upper inner cover 28 and the lower inner cover 30 cover the discharge unit 110 side of the support part 104 in the device depth direction.

Figure 15:
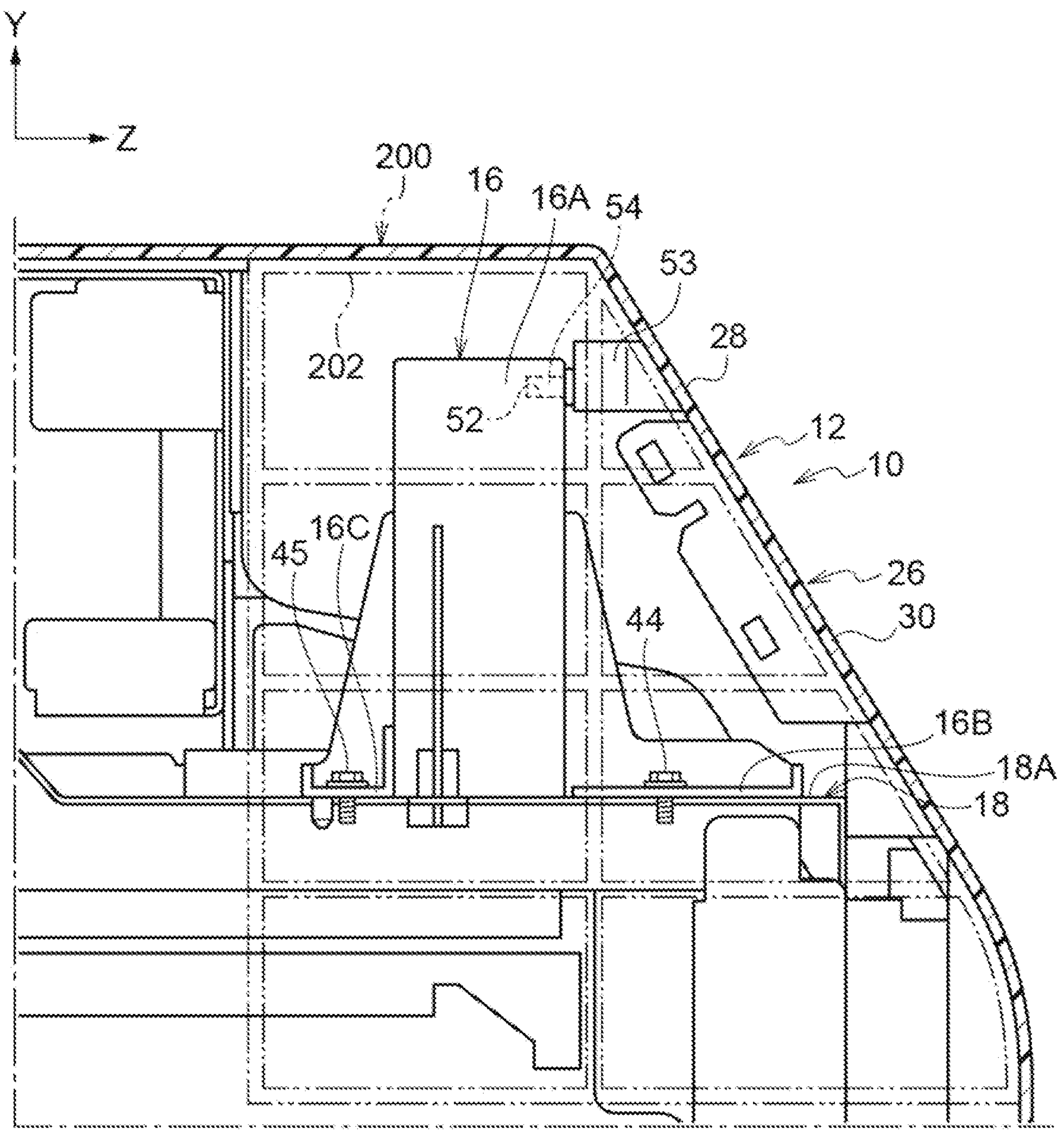
FIG. 15 is a cross-sectional view showing an inside of the upper inner cover and the lower inner cover.

Stiffness (namely, rigidity) of the upper inner cover 28 and the stiffness of the lower inner cover 30 which constitute the inner cover 26 are lower than stiffness of the upper cover 14. As shown in FIG. 15, in general support part cover 200, a rib 202 is provided on an inner surface of the support part cover. In the first embodiment, at least some of an inner surface of the upper inner cover 28 and an inner surface of the lower inner cover 30 around the bracket 16 has a flat surface shape and has a preset uniform thickness. No rib is provided on the inner surface of the upper inner cover 28 and the inner surface of the lower inner cover 30 at least on a back side of the bracket 16 in the device depth direction. As an example, no rib is provided on the inner surface of the upper inner cover 28 and the inner surface of the lower inner cover 30 around the bracket 16 (that is, without the rib 202 as shown in FIG. 15). Therefore, the upper inner cover 28 and the lower inner cover 30 are easily deformed as compared with the case where the rib is provided. Consequently, when the attachment position of the bracket 16 to the to-be-attached part 18 is adjusted in the device width direction (that is, the arrow X direction), the upper inner cover 28 and the lower inner cover 30 are slightly deformed depending on the attachment position of the bracket 16 to the to-be-attached part 18. Further, the rib may be provided on the inner surface of the upper inner cover 28 and the inner surface of the lower inner cover 30 on the front side of the bracket 16 in the device depth direction, that is, on the front surface side in the device depth direction.

In addition, in the first embodiment, the stiffness of the upper inner cover 28 and the stiffness of the lower inner cover 30 which constitute the inner cover 26 are higher than the stiffness of the outer cover 24. For example, no rib is provided on a side of an inner surface of the outer cover 24 facing the bracket 16, or the outer cover 24 has a thickness smaller than thicknesses of both the upper inner cover 28 and the lower inner cover 30. In this manner, the stiffness of the upper inner cover 28 and the stiffness of the lower inner cover 30 become higher than the stiffness of the outer cover 24. Here, “that the stiffness of the upper inner cover 28 and the stiffness of the lower inner cover 30 are higher than the stiffness of the outer cover 24” means that the upper inner cover 28 and the lower inner cover 30 are less likely to be deformed than the outer cover 24, that is, a load required for deformation is large. Consequently, when the upper inner cover 28 and the lower inner cover 30 are slightly deformed depending on attachment position of the bracket 16 to the to-be-attached part 18, the outer cover 24 positioned at the upper inner cover 28 and the lower inner cover 30 is likely to be deformed in conjunction with the upper inner cover 28 and the lower inner cover 30.

(Upper Cover)

As shown in FIGS. 2 and 3, the upper cover 14 covers at least one side (for example, the left side in the device width direction shown in FIG. 2) of the conveyance device 106 in the device width direction. In a closed state (see FIGS. 2 and 3) in which the conveyance device 106 is in contact with the reading unit 108, the upper cover 14 is disposed alongside an upper side of the support part cover 12. Here, “to be disposed alongside” means not only a case where the upper cover 14 is disposed directly alongside the upper side of the support part cover 12 (that is, disposed adjacent to each other), but also a case where the upper cover 14 is disposed indirectly alongside the upper side of the support part cover 12 (that is, with another member interposed between the upper cover 14 and the support part cover 12). In the first embodiment, the upper cover 14 is disposed adjacent to the upper side of the support part cover 12.

The upper cover 14 includes an outer portion 14A disposed alongside the outer cover 24 on the upper side of the outer cover 24 and an inner portion 14B disposed alongside the inner cover 26 on the upper side of the inner cover 26. In the first embodiment, the outer portion 14A and the inner portion 14B are configured by joining divided members, but the outer portion 14A and the inner portion 14B may be integrally configured.

(Bracket)

Figure 5:
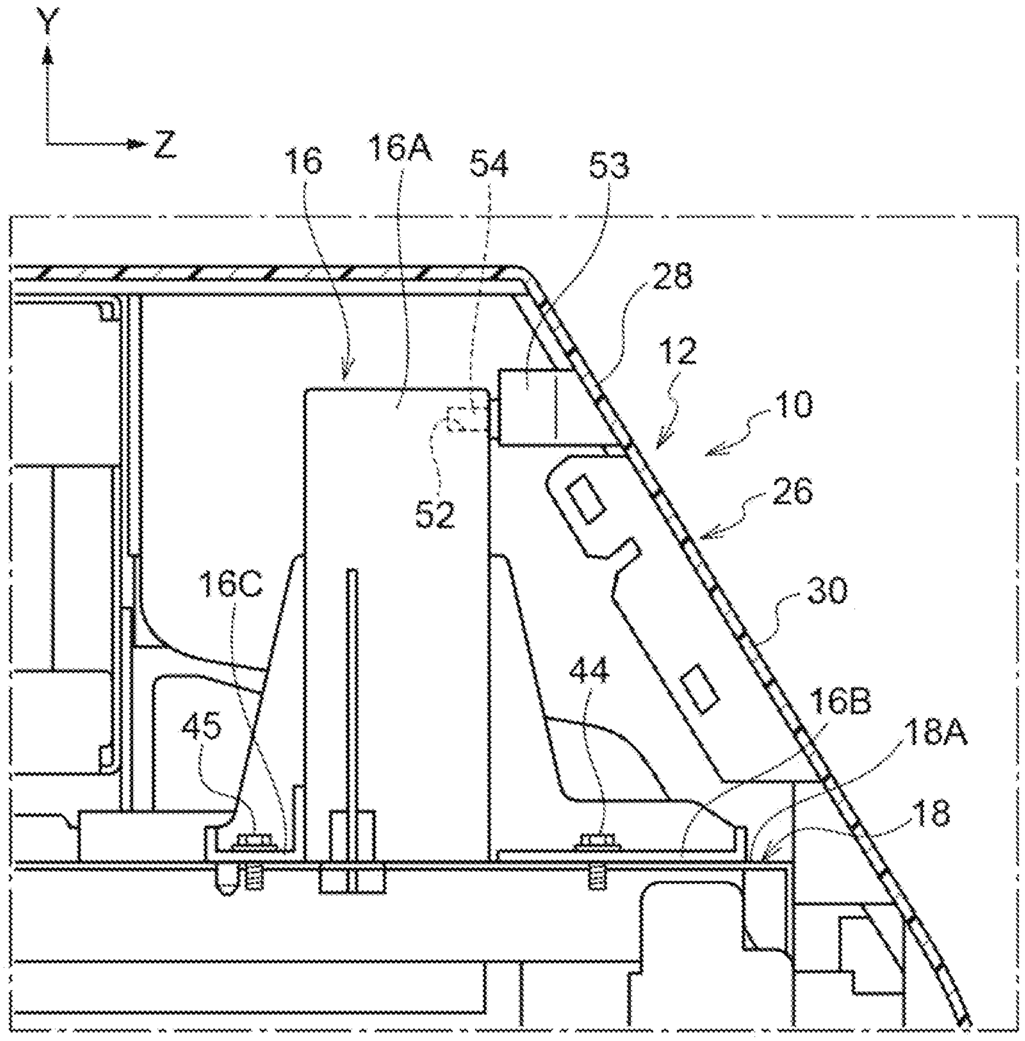
FIG. 5 is a side view showing a state in which an upper inner cover is positioned on a bracket disposed inside the support part cover of the attachment structure according to the first embodiment.

As shown in FIGS. 4 and 5, the bracket 16 is disposed inside the support part cover 12. In the first embodiment, the bracket 16 positions the upper inner cover 28 of the support part cover 12. The bracket 16 is attached to the to-be-attached part 18 provided at a middle portion in the vertical direction inside the support part 104. For example, the to-be-attached part 18 is formed of a part of a frame provided inside the support part 104. The to-be-attached part 18 includes an attachment surface 18A disposed in a horizontal direction.

Figure 6:
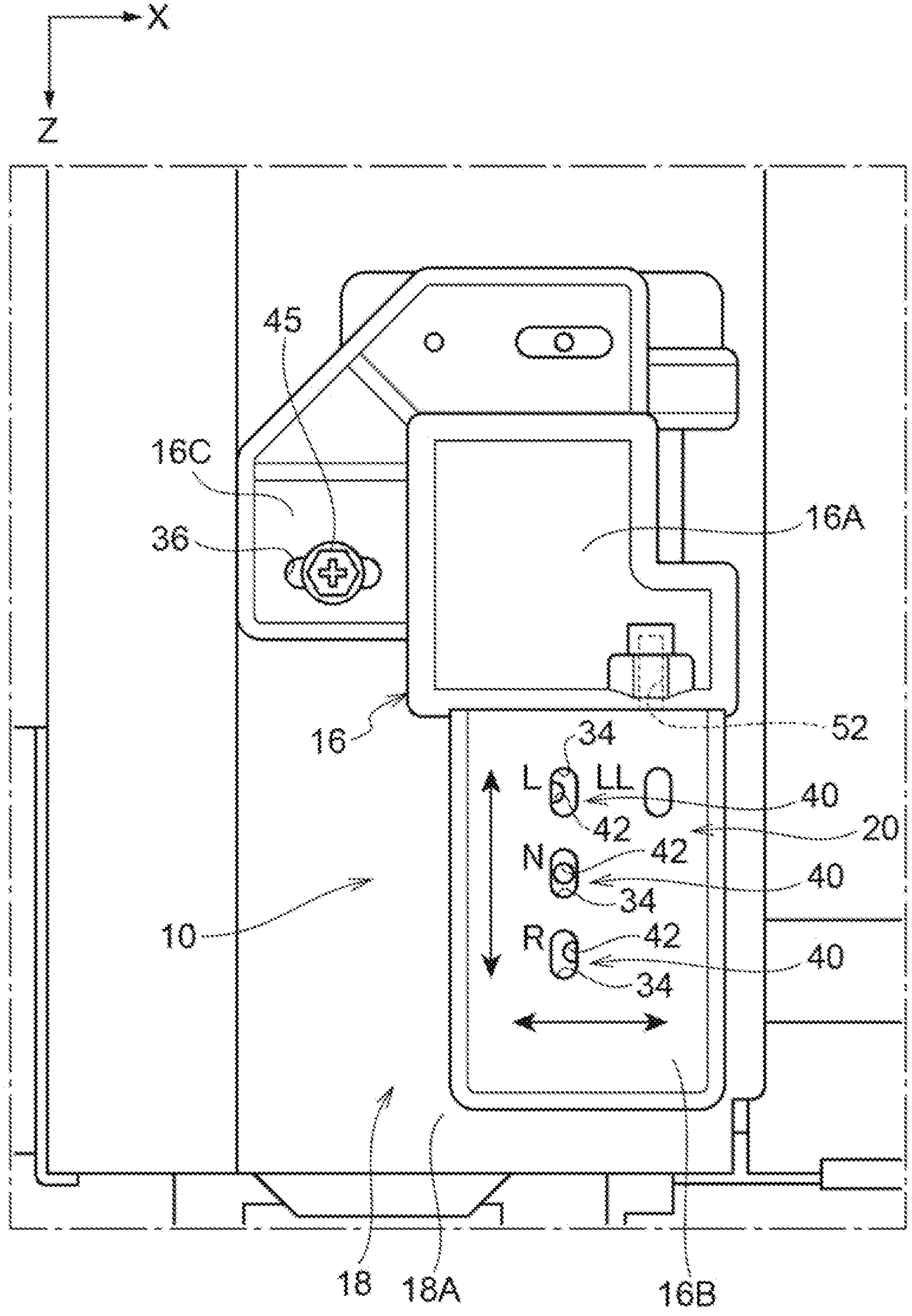
FIG. 6 is a plan view showing a state in which an attachment position of the bracket to the to-be-attached part of the attachment structure according to the first embodiment is adjusted.

The bracket 16 includes a block portion 16A extending in the vertical direction and plate-shaped attachment portions 16B and 16C disposed along the to-be-attached part 18 from a lower end portion of the block portion 16A (see FIG. 6). The bracket 16 has an L shape in a plan view shown in FIG. 6. The attachment portion 16B extends from the block portion 16A to the front side in the device depth direction. The attachment portion 16C extends outward in the device width direction from the block portion 16A.

The attachment portion 16B has a plurality of (three in the first embodiment) through-holes 34 arranged at intervals in the device depth direction. As an example, the through-hole 34 is a long hole elongated in the device depth direction. The plurality of through-holes 34 are disposed so as not to be shifted in the device width direction of attachment portion 16B.

In addition, the attachment portion 16C has a long hole 36 elongated in the device width direction. One long hole 36 is provided. A screw 45 penetrates the long hole 36 and is fastened in a screw hole (not shown) of the to-be-attached part 18, so that the attachment portion 16C is fixed to the attachment surface 18A of the to-be-attached part 18. The long hole 36 provided in the attachment portion 16C enables the attachment portion 16C to be fixed to the to-be-attached part 18 even when the position of the bracket 16 is adjusted in the device width direction (that is, the arrow X direction). A configuration in which the attachment portions 16B and 16C of the bracket 16 are attached to the to-be-attached part 18 will be described later.

Figure 9A:
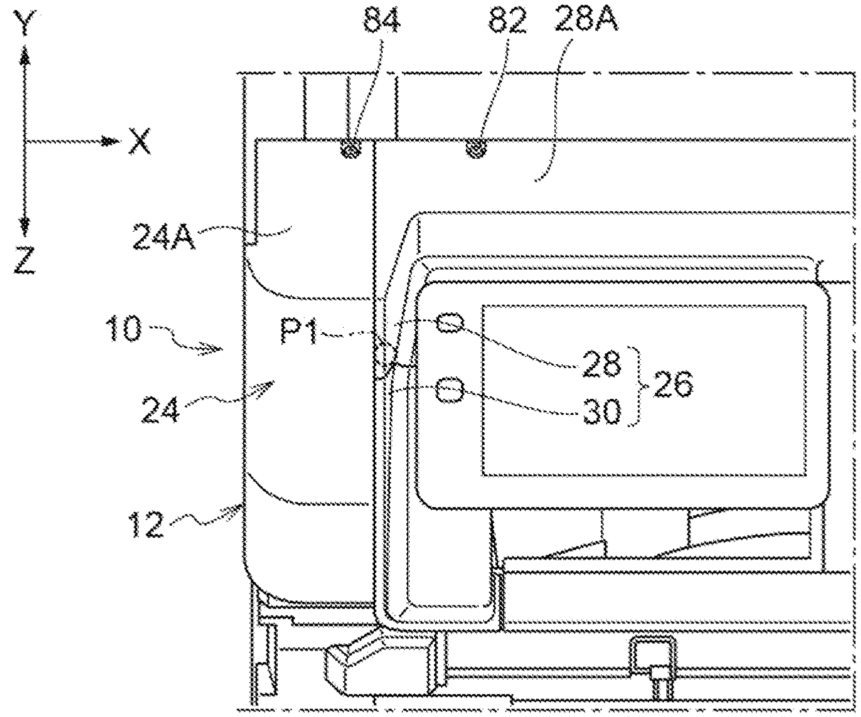
FIG. 9A is a schematic front view showing positioning positions of the upper inner cover and the bracket.
Figure 9B:
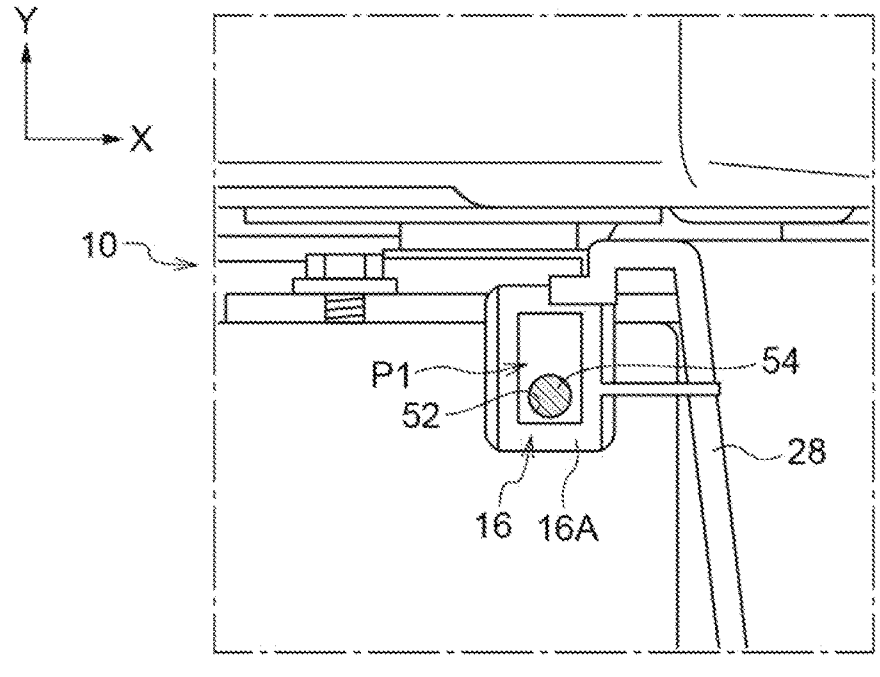
FIG. 9B is a cross-sectional view showing a state in which the upper inner cover is positioned at the bracket.

As shown in FIGS. 5 and 9B, a recess 52 for positioning the upper inner cover 28 is provided in a surface of an upper section of the block portion 16A of the bracket 16 on the front side in the device depth direction. A projecting portion 53 is provided on the inner surface of the upper inner cover 28, and the upper inner cover 28 is positioned at the bracket 16 by inserting a boss 54 formed at a distal end of the projecting portion 53 into the recess 52. A positioning structure of the upper inner cover 28, the lower inner cover 30, and the outer cover 24 constituting the support part cover 12 will be described in detail below.

(Adjustment Part)

Figure 7:
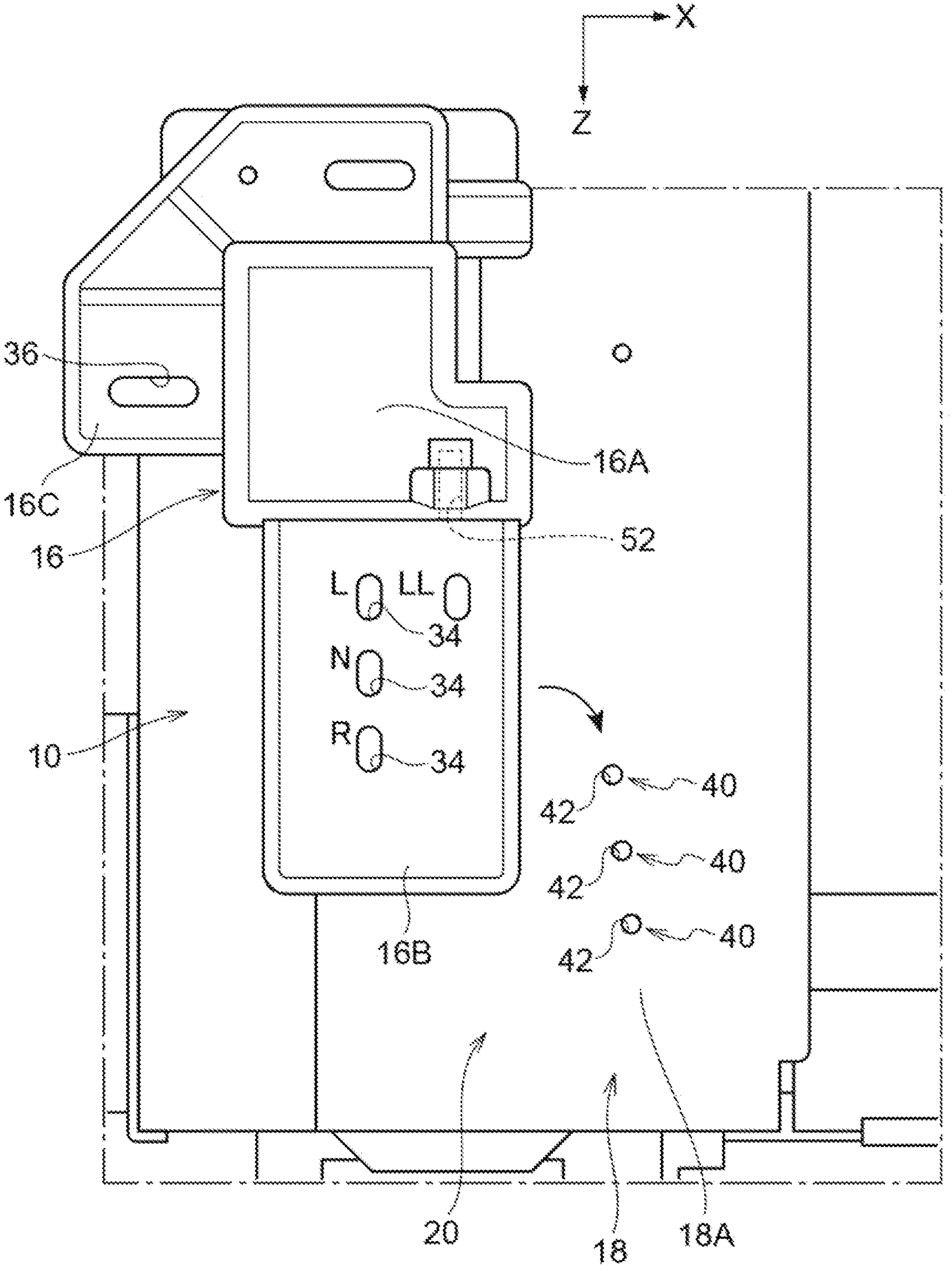
FIG. 7 is a plan view showing a state in which the bracket and the to-be-attached part of the attachment structure according to the first embodiment are separated from each other.

The adjustment part (an example of the adjustment portion) 20 has a function of adjusting the attachment position of the bracket 16 to the to-be-attached part 18 in the device width direction (that is, the arrow X direction). As shown in FIGS. 6 and 7, the adjustment part 20 includes a plurality of fixing parts 40 arranged by being shifted in the device width direction. The plurality of fixing parts 40 include a plurality of (three in the first embodiment) screw holes 42 provided in the to-be-attached part 18 and a screw 44 that is inserted into one of the plurality of screw holes to fix the bracket 16. The screw hole 42 is an example of a hole, and the screw 44 is an example of an insertion element.

The plurality of screw holes 42 are arranged at intervals in the device depth direction and are misaligned by a distance smaller than a diameter of the screw hole 42 in the device width direction. As an example, the plurality of screw holes 42 are misaligned by a distance equal to or larger than a radius of the screw hole 42 in the device width direction, and misalignment amounts of the plurality of screw holes 42 in the device width direction are all equal. Further, instead of this configuration, the plurality of screw holes 42 may be configured by being misaligned by a distance smaller than the radius of the screw hole 42 in the device width direction.

As described above, the plurality of fixing parts (an example of fixing portions 40 include the through-holes 34 formed of the plurality of (three in the first embodiment) long holes provided in the attachment portion 16B of the bracket 16. The number of the screw holes 42 is the same as the number of the through-holes 34. The plurality of through-holes 34 are arranged to match the positions of the plurality of screw holes 42 in the device depth direction. In the first embodiment, the plurality of (three in the first embodiment) fixing parts 40 are configured of a combination of the plurality of screw holes 42 arranged in the device depth direction and the through-holes 34 arranged corresponding to the respective screw holes 42.

The adjustment part 20 adjusts the attachment position of the bracket 16 to the to-be-attached part 18 by performing fixing using any one of the plurality of fixing parts 40 arranged by being shifted in the device width direction. Specifically, a shaft portion of the screw 44 (see FIG. 5) penetrates any one of the plurality of through-holes 34 of the bracket 16, and the screw 44 is fastened in one of the screw holes 42 of the to-be-attached part 18 corresponding to the penetrated through-hole 34. Consequently, the bracket 16 is attached to the to-be-attached part 18, and the attachment position of the bracket 16 to the to-be-attached part 18 is adjusted in the device width direction. In the first embodiment, since the three fixing parts 40 are provided, the attachment position of the bracket 16 to the to-be-attached part 18 is adjusted in three stages.

(Positioning Structure of Support Part Cover)

Figure 8:
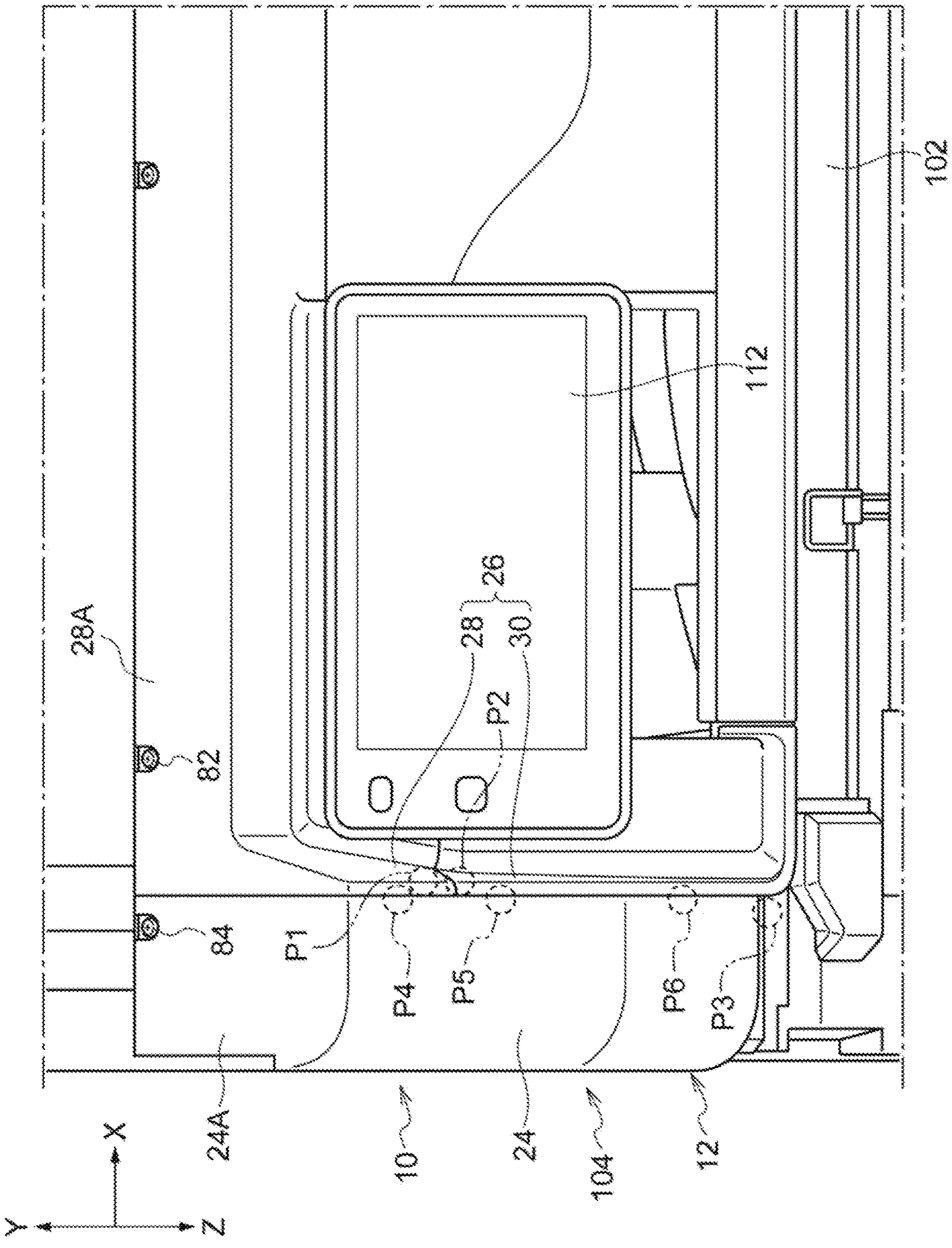
FIG. 8 is a perspective view showing the upper inner cover, a lower inner cover, and an outer cover constituting the support part cover of the attachment structure according to the first embodiment.

As shown in FIGS. 5, 8, and 9A, the upper inner cover 28 of the support part cover 12 is positioned at the bracket 16 at a first position P1. As shown in FIGS. 9A and 9B, at the first position P1, the circular recess 52 is provided in a surface of the upper section of the block portion 16A of the bracket 16 on the front side in the device depth direction. The cylindrical boss 54 projecting toward the back side in the device depth direction is provided on the inner surface of the upper inner cover 28. At the first position P1, the boss 54 of the upper inner cover 28 is inserted into the recess 52 of the bracket 16, so that the upper inner cover 28 is positioned at the bracket 16. As an example, the upper inner cover 28 is attached to the bracket 16 toward the back side in the device depth direction, so that the boss 54 of the upper inner cover 28 is inserted into the recess 52 of the bracket 16.

Figure 10A:
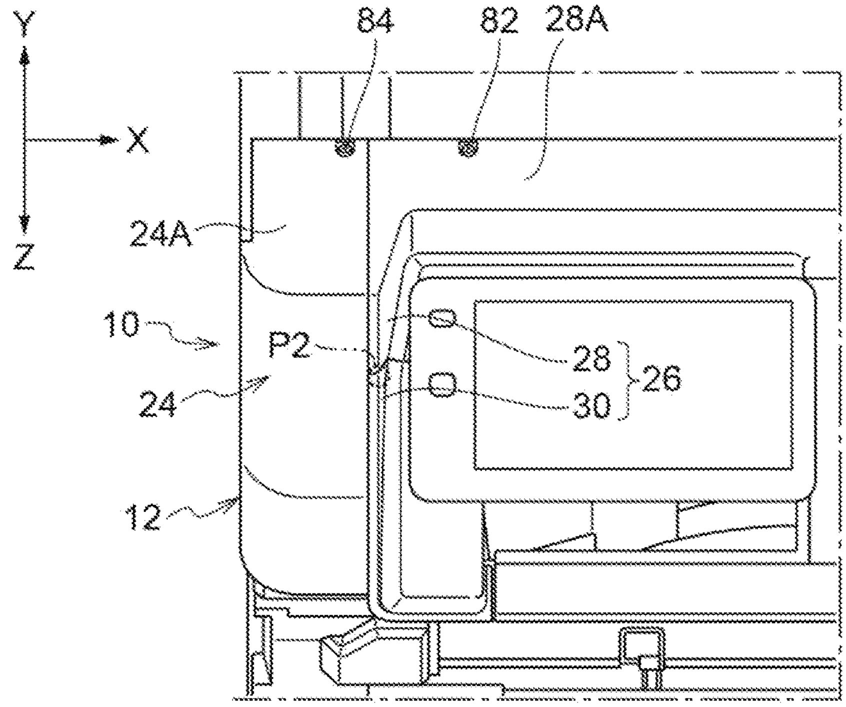
FIG. 10A is a schematic front view showing positioning positions of the upper inner cover and the lower inner cover.
Figure 10B:
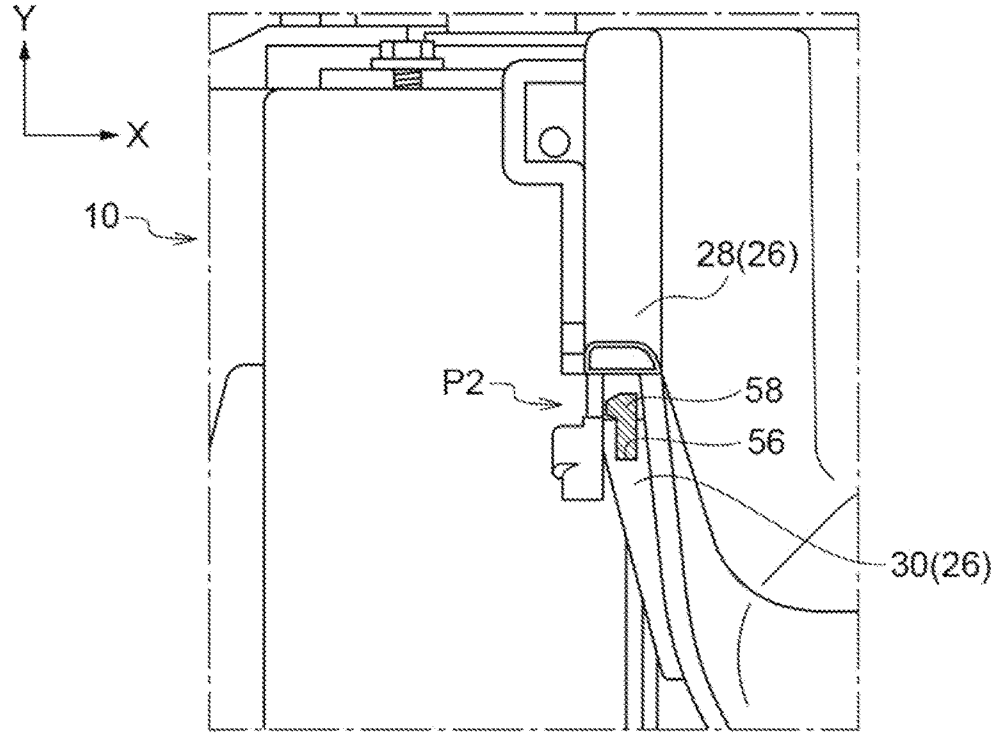
FIG. 10B is a cross-sectional view showing a state in which the upper inner cover is positioned at the lower inner cover.

As shown in FIGS. 8 and 10A, the upper inner cover 28 of the support part cover 12 is positioned at the lower inner cover 30 at a second position P2. As shown in FIGS. 10A and 10B, at the second position P2, a U-shaped recess 56 is provided in a surface of the upper section of the lower inner cover 30 on the front side in the device depth direction. The inner surface of the upper inner cover 28 has a rib 58 projecting toward the back side in the device depth direction. At the second position P2, the rib 58 of the upper inner cover 28 is inserted into the recess 56 of the lower inner cover 30, so that the upper inner cover 28 is prevented from rotating relative to the lower inner cover 30. There may be a slight gap between the rib 58 and the recess 56. As an example, the upper inner cover 28 is attached to the lower inner cover 30 toward the back side in the device depth direction, so that the rib 58 of the upper inner cover 28 is inserted into the recess 56 of the lower inner cover 30.

Figure 11A:
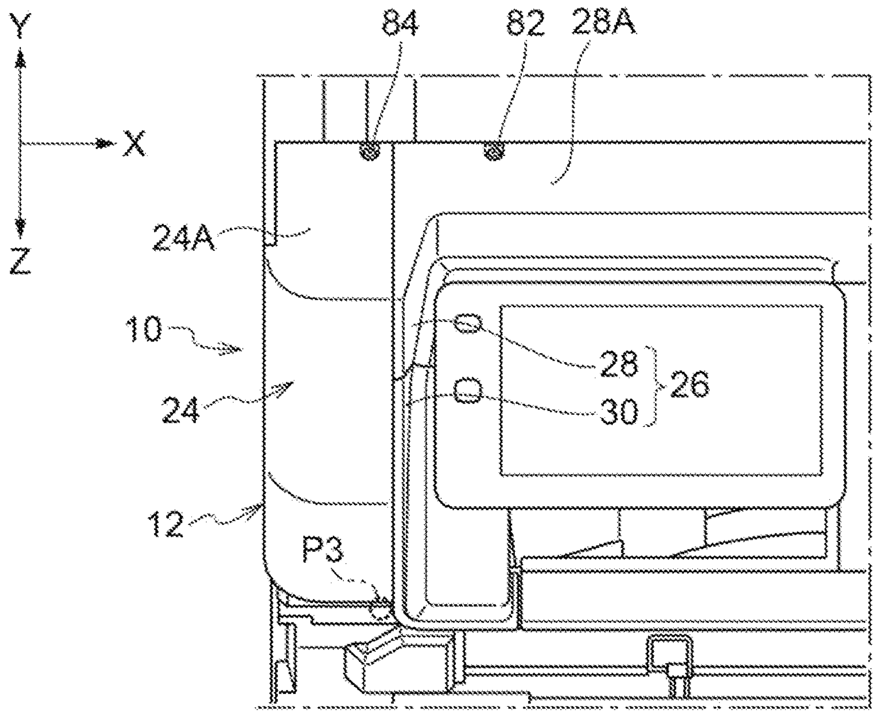
FIG. 11A is a schematic front view showing positioning positions of the lower inner cover and a frame.
Figure 11B:
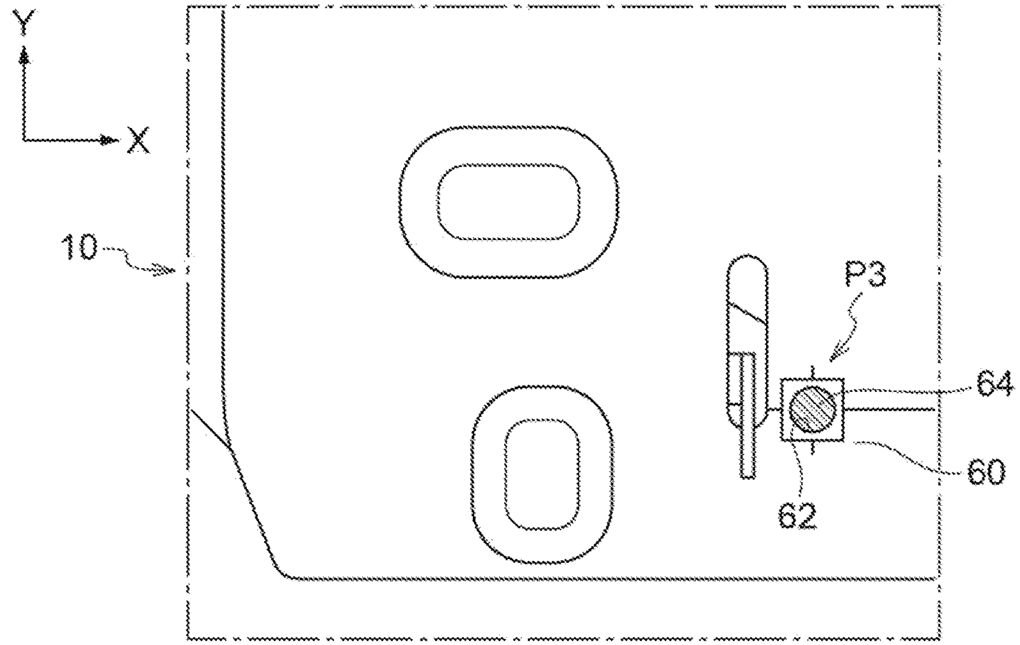
FIG. 11B is a cross-sectional view showing a state in which the lower inner cover is positioned at the frame.

As shown in FIGS. 8 and 11A, a lower side of the lower inner cover 30 of the support part cover 12 is positioned at the frame 60 inside the support part 104 at a third position P3. As shown in FIGS. 11A and 11B, at the third position P3, the frame 60 has a circular recess 62 for performing positioning. A cylindrical boss 64 projecting toward the back side in the device depth direction is provided on an inner surface of a lower section of the lower inner cover 30. At the third position P3, the boss 64 of the lower inner cover 30 is inserted into the recess 62 of the frame 60, so that the lower side of the lower inner cover 30 is positioned at the frame 60. As an example, the boss 64 of the lower inner cover 30 is inserted into the recess 62 of the frame 60 by attaching the lower inner cover 30 to the frame 60 toward the back side in the device depth direction. Since the position of the recess 62 of the frame 60 is fixed, the upper side of the lower inner cover 30 rotates about the boss 64 inserted into the recess 62 of the frame 60 as a fulcrum at the time of assembly.

Figure 12A:
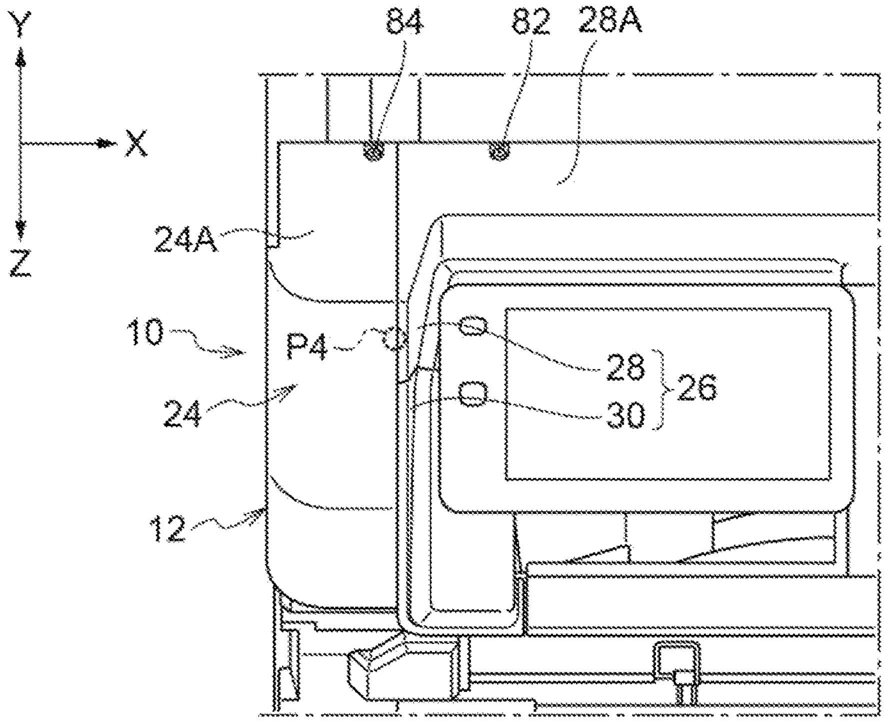
FIG. 12A is a schematic front view showing positioning positions of the outer cover and the upper inner cover.
Figure 12B:
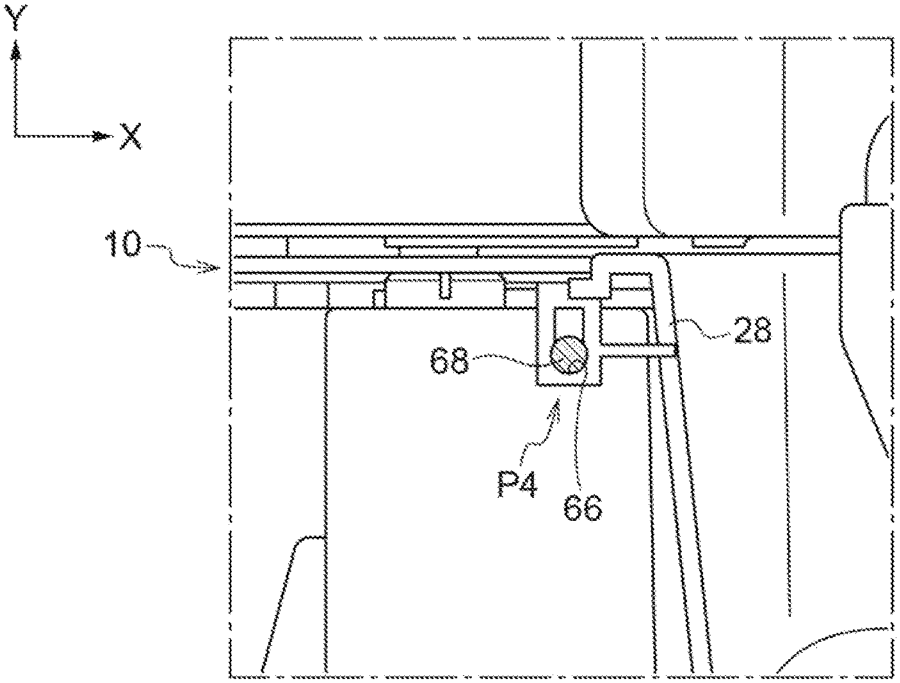
FIG. 12B is a cross-sectional view showing a state in which the outer cover is positioned at the upper inner cover.

As shown in FIGS. 8 and 12A, the outer cover 24 of the support part cover 12 is positioned at the upper inner cover 28 at a fourth position P4. As shown in FIGS. 12A and 12B, at the fourth position P4, a circular recess 66 is provided in a surface of the upper section of the upper inner cover 28 on the front side in the device depth direction. The inner surface of the outer cover 24 has a cylindrical boss 68 projecting toward the back side in the device depth direction. At the fourth position P4, the boss 68 of the outer cover 24 is inserted into the recess 66 of the upper inner cover 28, so that the outer cover 24 is prevented from rotating relative to the upper inner cover 28. As an example, the outer cover 24 is attached to the upper inner cover 28 toward the back side in the device depth direction, so that the boss 68 of the outer cover 24 is inserted into the recess 66 of the upper inner cover 28.

Figure 13A:
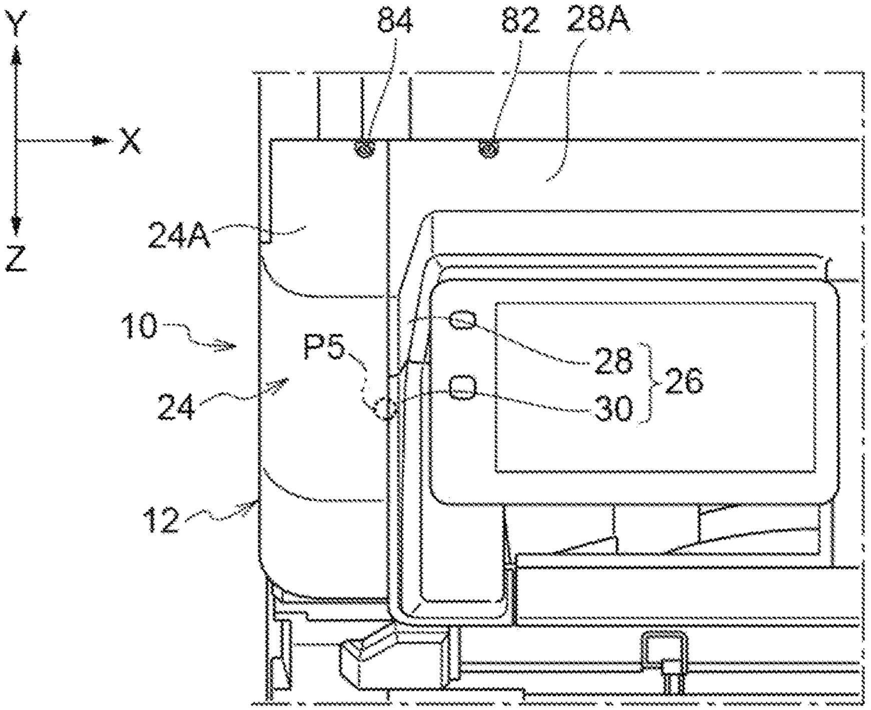
FIG. 13A is a schematic front view showing positioning positions of the outer cover and an upper section of the lower inner cover.
Figure 13B:
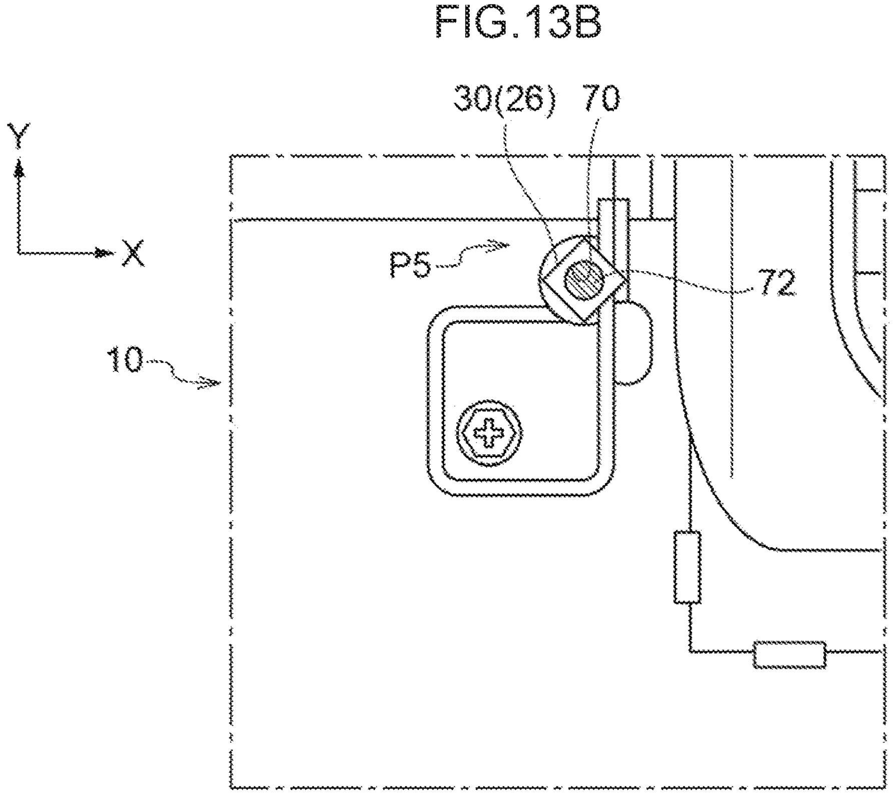
FIG. 13B is a cross-sectional view showing a state in which the outer cover is positioned at the upper section of the lower inner cover.

As shown in FIGS. 8 and 13A, the outer cover 24 of the support part cover 12 is positioned at the lower inner cover 30 at a fifth position P5. As shown in FIGS. 13A and 13B, at the fifth position P5, a circular recess 70 is provided in a surface of a middle portion in the vertical direction of the lower inner cover 30 on the front side in the device depth direction. The inner surface of the outer cover 24 has a cylindrical boss 72 projecting toward the back side in the device depth direction. At the fifth position P5, the boss 72 of the outer cover 24 is inserted into the recess 70 of the lower inner cover 30, so that the outer cover 24 is prevented from rotating relative to the lower inner cover 30. As an example, the outer cover 24 is attached to the lower inner cover 30 toward the back side in the device depth direction, so that the boss 72 of the outer cover 24 is inserted into the recess 70 of the lower inner cover 30.

Figure 14A:
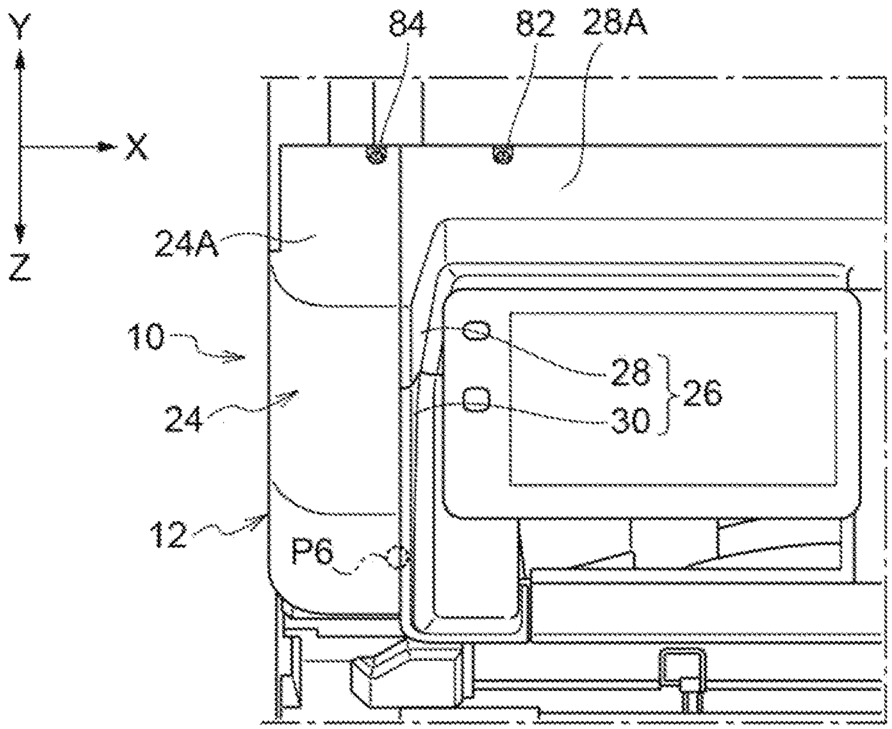
FIG. 14A is a schematic front view showing positioning positions of the outer cover and a lower section of the lower inner cover.
Figure 14B:
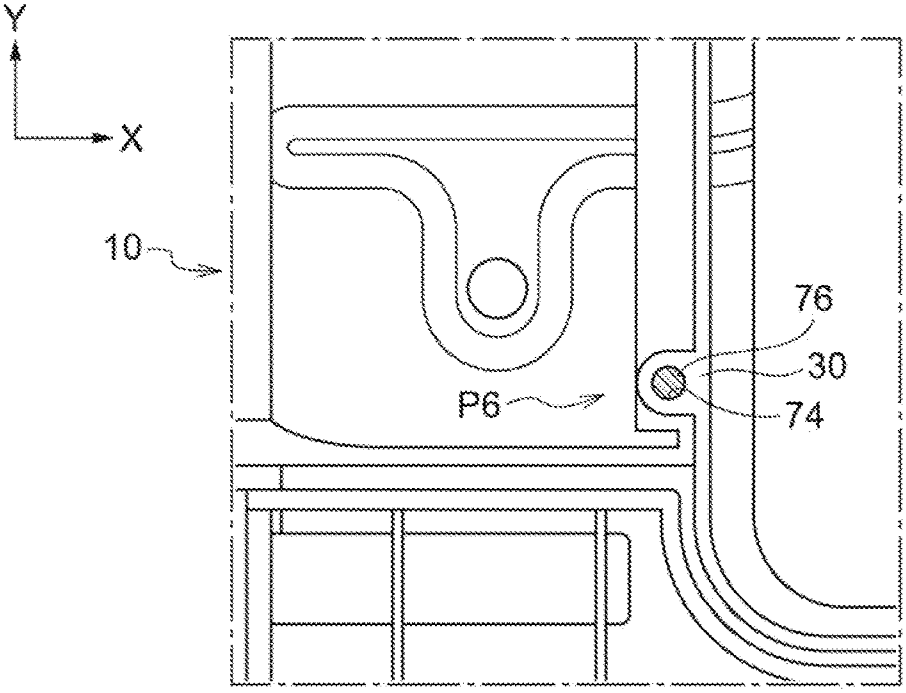
FIG. 14B is a cross-sectional view showing a state in which the outer cover is positioned at the lower section of the lower inner cover.

As shown in FIGS. 8 and 14A, the outer cover 24 of the support part cover 12 is positioned at the lower inner cover 30 at a sixth position P6. As shown in FIGS. 14A and 14B, at the sixth position P6, a circular recess 74 is provided in the surface on the lower side of the lower inner cover 30 on the front side in the device depth direction. The inner surface of the outer cover 24 has a cylindrical boss 76 projecting toward the back side in the device depth direction. At the sixth position P6, the boss 76 of the outer cover 24 is inserted into the recess 74 of the lower inner cover 30, so that the outer cover 24 is positioned at the lower inner cover 30. As an example, the outer cover 24 is attached to the lower inner cover 30 toward the back side in the device depth direction, so that the boss 76 of the outer cover 24 is inserted into the recess 74 of the lower inner cover 30.

In the positioning structure of the support part cover 12 as described above, the first position P1 moves in the device width direction by moving the attachment position of the bracket 16 to the to-be-attached part 18 in the device width direction. Accordingly, the inner cover 26 (that is, the lower inner cover 30 and the upper inner cover 28) and the outer cover 24 move in conjunction with the bracket 16 with the boss 64 of the lower inner cover 30 inserted into the recess 62 of the frame 60 as a fulcrum.

As shown in FIG. 8, the upper surface portion 28A of the upper inner cover 28 is fixed to an upper frame (not shown) of the support part 104 by a screw 82 on the back side in the device depth direction. In addition, an upper surface portion 24A of the outer cover 24 is fixed to the upper frame (not shown) of the support part 104 by a screw 84 on the back side in the device depth direction. The upper frame is an example of the main body portion. In the first embodiment, in a state where the conveyance device 106 covers an upper surface of the support part 104, the upper inner cover 28 is positioned at the bracket 16, and a position (that is, a fixing position of the screw 84) where the outer cover 24 is fixed to the upper frame (not shown) of the support part 104 is covered with the upper cover 14.

Functions and Effects

Next, functions and effects of the first embodiment will be described.

In the attachment structure 10 of the first embodiment, the conveyance device 106 is provided via the support part 104 disposed above the image formation device main body 102 that records an image. The support part cover 12 is provided on an outer surface of the support part 104. The upper cover 14 is provided on an outer surface of the conveyance device 106. The upper cover 14 is disposed alongside the upper side of the support part cover 12. In addition, the attachment structure 10 includes the bracket 16 attached to the to-be-attached part 18 disposed inside the support part 104, and the bracket 16 positions the upper inner cover 28 constituting the support part cover 12. In addition, the attachment structure 10 also includes the adjustment part 20 that adjusts the attachment position of the bracket 16 to the to-be-attached part 18 by performing fixing using any one of the plurality of fixing parts 40 arranged by being shifted in the device width direction.

In general, in a configuration in which the upper cover of the conveyance device is disposed alongside the upper side of the support part cover, the upper cover and the support part cover may be relatively misaligned in the device width direction (that is, the arrow X direction). For example, in a configuration in which the conveyance device is supported to be movable or rotatable with respect to the upper section of the support part, the upper cover of the conveyance device and the support part cover are likely to be relatively misaligned in the device width direction depending on deformation of a unit constituting the conveyance device due to a load, cumulative intersection of the respective components constituting the conveyance device, a tilt of a unit to a rightward or leftward side in order to ensure scanning performance of the reading unit, or the like. In particular, in a configuration in which the front surface side of the image formation device is disposed at a position far from a connection position where the conveyance device is movably and rotatably connected to the upper section of the support part, when the upper cover and the support part cover are relatively misaligned in the device width direction on the front surface side of the image formation device, the design quality of the external appearance may be impaired.

In the attachment structure 10 of the first embodiment, the adjustment part 20 adjusts the attachment position of the bracket 16 to the to-be-attached part 18 in the device width direction. The adjustment part 20 adjusts the position of the bracket 16 in the device width direction by aligning one of the plurality of (three in the first embodiment) through-holes 34 of the bracket 16 with the corresponding screw hole 42 of the plurality of (three in the first embodiment) screw holes 42 of the to-be-attached part 18. Accordingly, the shaft portion of the screw 44 penetrates the through-hole 34 of the bracket 16 and is fastened in the screw hole 42 of the to-be-attached part 18, so that the bracket 16 is attached to the to-be-attached part 18. Consequently, the attachment position of the bracket 16 to the to-be-attached part 18 is adjusted in the device width direction.

Moreover, the upper inner cover 28 constituting the support part cover 12 is positioned at the bracket 16, so that the position of the support part cover 12 in the device width direction can be adjusted along with the position of the upper cover 14 of the conveyance device 106.

In the attachment structure 10, as described above, the adjustment part 20 adjusts the attachment position of the bracket 16 to the to-be-attached part 18 by performing fixing using any one of the plurality of fixing parts 40 arranged by being shifted in the device width direction. Therefore, in the attachment structure 10, as compared with a case where the attachment position of the attachment member to the frame is adjusted and fixed by the adjustment part using one long hole, it is easy to adjust the positional misalignment of the support part cover 12 and the upper cover 14 in the device width direction. Hence, it is possible to suppress positional misalignment of the support part cover 12 and the upper cover 14 in the device width direction.

In the attachment structure 10, the plurality of fixing parts 40 include a plurality of (three in the first embodiment) screw holes 42 provided in the to-be-attached part 18. The plurality of screw holes 42 are arranged at intervals in the device depth direction and are misaligned by a distance smaller than a diameter of the screw hole 42 in the device width direction. Accordingly, the screw 44 penetrates the through-hole 34 of the bracket 16, and the screw 44 is fastened in one of the plurality of screw holes 42, so that the bracket 16 is fixed to one of the screw holes 42. Therefore, in the attachment structure 10, the positional adjustment can be performed within a range smaller than the diameter of the screw hole 42 when the bracket 16 is attached to the to-be-attached part 18 as compared with the case where the plurality of holes are arranged in the attachment member along the device width direction.

In the attachment structure 10, the support part cover 12 is divided into the outer cover 24 that covers a part of the device front surface and an outer side in the device width direction and the inner cover 26 that is disposed inside the outer cover 24 in the device width direction. Consequently, when the upper inner cover 28 constituting the inner cover 26 is positioned at the bracket 16, the inner cover 26 and the outer cover 24 move following the position of the bracket 16 in the device width direction. Therefore, in the attachment structure 10, the positions of the outer cover 24 and the inner cover 26 can be accurately adjusted according to the adjustment position of the bracket 16 in the device width direction as compared with the case where the support part cover is integrally formed.

In the attachment structure 10, the upper inner cover 28 constituting the inner cover 26 is positioned at the bracket 16, and the outer cover 24 is positioned at the inner cover 26 (that is, the upper inner cover 28 and the lower inner cover 30). Moreover, the stiffness of the inner cover 26 is higher than the stiffness of the outer cover 24. Consequently, when the upper inner cover 28 constituting the inner cover 26 is positioned at the bracket 16, the inner cover 26 and the outer cover 24 move following the position of the bracket 16 in the device width direction. At this time, since the stiffness of the inner cover 26 is higher than the stiffness of the outer cover 24, the outer cover 24 easily moves following the position of the inner cover 26. Therefore, in the attachment structure 10, it is easy to adjust a position of a boundary area between the outer cover 24 and the inner cover 26 as compared with the case where both the outer cover and the inner cover are positioned at the attachment member.

In the attachment structure 10, the inner cover 26 of the support part cover 12 has no rib at least on the back side in the device depth direction of the bracket 16. Consequently, when the upper inner cover 28 constituting the inner cover 26 is positioned at the bracket 16, the inner cover 26 easily moves following the position of the bracket 16 in the device width direction. Therefore, in the attachment structure 10, an adjustment allowance of the position of the bracket 16 can be increased as compared with the case where the rib is provided on the inner cover on the back side in the device depth direction of the attachment member.

In the attachment structure 10, the lower side of the lower inner cover 30 constituting the support part cover 12 is positioned at the frame 60 disposed inside the support part cover 12. In the first embodiment, the boss 64 of the lower inner cover 30 is inserted into the recess 62 of the frame 60, so that the lower side of the lower inner cover 30 is positioned at the frame 60. Therefore, in the attachment structure 10, the upper side of the inner cover 26 of the support part cover 12 can be deformed and positioned at the bracket 16 with the lower side of the inner cover 26 of the support part cover 12 as a fulcrum.

In the attachment structure 10, in a state where the upper surface of the support part 104 is covered by the conveyance device 106, the upper inner cover 28 constituting the inner cover 26 is positioned at the bracket 16, and the position where the outer cover 24 is fixed to the upper frame of the support part 104 is covered by the upper cover 14. In the first embodiment, the position where the upper surface portion 24A of the outer cover 24 is fixed to the upper frame of the support part 104 by the screw 84 is covered with the upper cover 14. In the first embodiment, when the upper inner cover 28 constituting the inner cover 26 is positioned at the bracket 16, the inner cover 26 moves following the position of the bracket 16 in the device width direction, and the outer cover 24 moves along with the position of the inner cover 26. Hence, distortion may occur in the outer cover 24. Therefore, in the attachment structure 10, it is possible to place the distortion of the outer cover 24 in a region that is unlikely to be seen from the outside, as compared with the case where the position where the outer cover is fixed to the main body portion is exposed to the outside of the upper cover.

In addition, the image formation device 100 includes the attachment structure 10, the reading unit 108 that reads information of the body to be conveyed which is conveyed by the conveyance device 106, and the image formation device main body 102 including the recording unit that records the information read by the reading unit 108 on a recording medium. Therefore, in the image formation device 100, as compared with the case where the attachment position of the attachment member to the frame is adjusted and fixed by the adjustment part using one long hole, it is easy to adjust the positional misalignment of the support part cover 12 and the upper cover 14 in the device width direction. Hence, degradation of the design quality of the external appearance due to the positional misalignment of the support part cover 12 and the upper cover 14 in the device width direction is suppressed.

Second Embodiment

Next, an attachment structure according to a second embodiment will be described with reference to FIG. 16. Further, the same components as those of the first embodiment described above are denoted by the same reference numerals, and the description thereof will be omitted.

Figure 16:
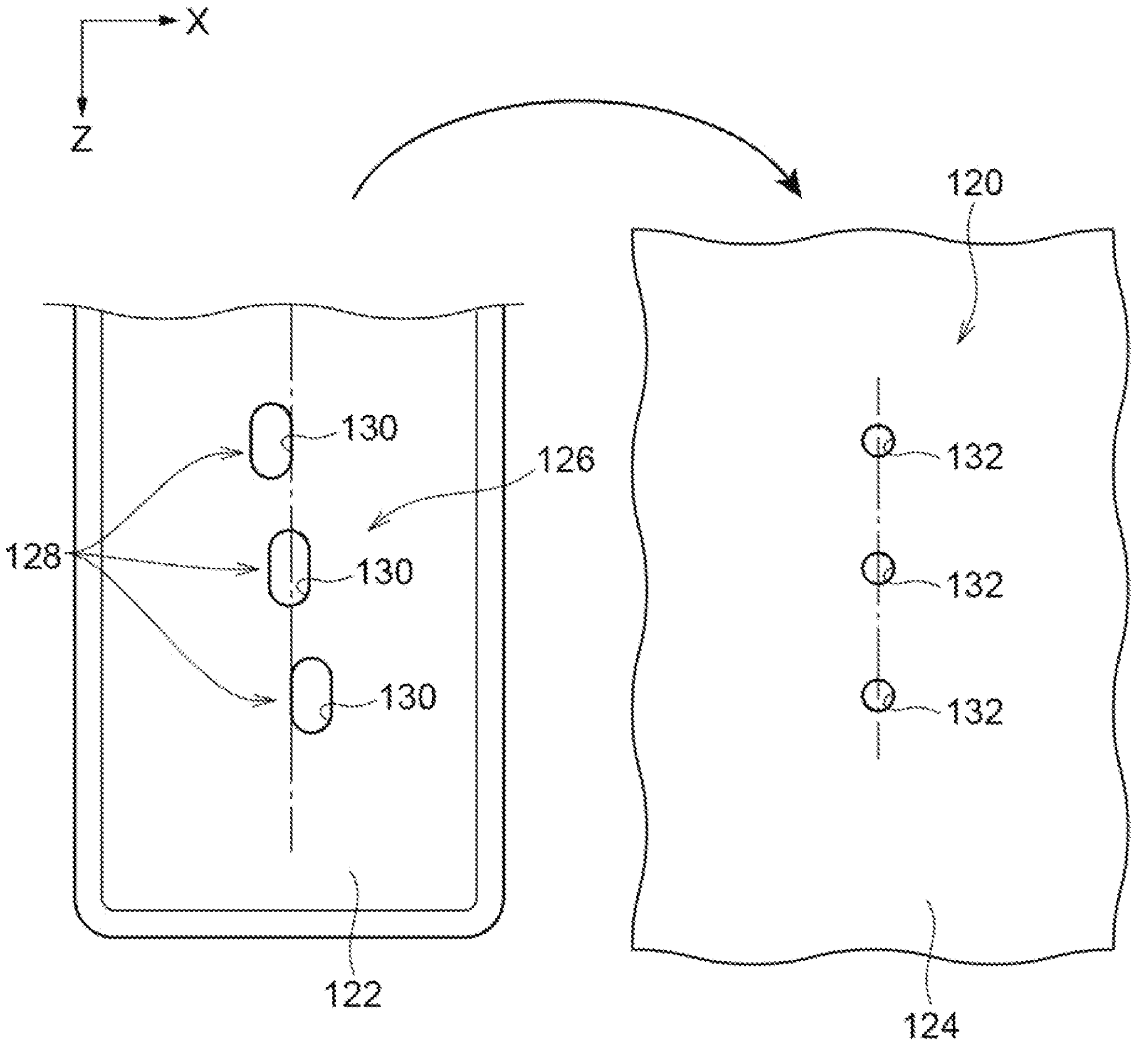
FIG. 16 is a plan view showing a state in which a bracket and a to-be-attached part of an attachment structure according to a second embodiment are separated from each other.

As shown in FIG. 16, an attachment structure 120 includes an adjustment part 126 instead of the adjustment part 20 of the attachment structure 10 of the first embodiment. The adjustment part 126 adjusts an attachment position of a bracket 122 to a to-be-attached part 124 by performing fixing using any one of a plurality of (three in the second embodiment) fixing parts 128 arranged by being shifted in the device width direction. The plurality of fixing parts 128 include a plurality of (three in the second embodiment) through-holes 130 provided in the bracket 122. The plurality of through-holes 130 are arranged at intervals in the device depth direction and are misaligned by a distance smaller than a diameter in a transverse direction of the through-hole 130 in the device width direction. The through-hole 130 is a long hole elongated in the device depth direction. The bracket 122 is an example of an attachment member.

In addition, the to-be-attached part 124 has a plurality of (three in the second embodiment) screw holes 132 arranged at intervals in the device depth direction. The screw hole 132 is an example of a hole. In addition, the screw 44 (see FIG. 5) as an example of an insertion element penetrates one of the plurality of through-holes 130 and is fastened in one of the plurality of screw holes 132 of the to-be-attached part 124, and thereby the bracket 122 is fixed to one of the plurality of screw holes 132. Further, other configurations of the attachment structure 120 are similar to those of the attachment structure 10 of the first embodiment.

In the attachment structure 120, the following functions and effects can be obtained in addition to the effects of the same configurations as those of the attachment structure 10 of the first embodiment.

In the attachment structure 120, the plurality of through-holes 130 of the bracket 122 are arranged at intervals in the device depth direction and are misaligned by a distance smaller than a diameter in a transverse direction of the through-hole 130 in the device width direction. Accordingly, the screw 44 (see FIG. 5) penetrates one of the plurality of through-holes 130 and is fastened in one of the plurality of screw holes 132 of the to-be-attached part 124, and thereby the bracket 122 is fixed to one of the plurality of screw holes 132. Therefore, in the attachment structure 120, the positional adjustment can be performed within a range smaller than the diameter in the transverse direction of the through-hole 130 when the bracket 122 is attached to the to-be-attached part 124 as compared with the case where the plurality of through-holes are arranged in the attachment member in the device width direction.

Third Embodiment

Next, an attachment structure according to a third embodiment will be described with reference to FIG. 17. Further, the same components as those of the first and second embodiments are denoted by the same reference numerals, and the description thereof will be omitted.

Figure 17:
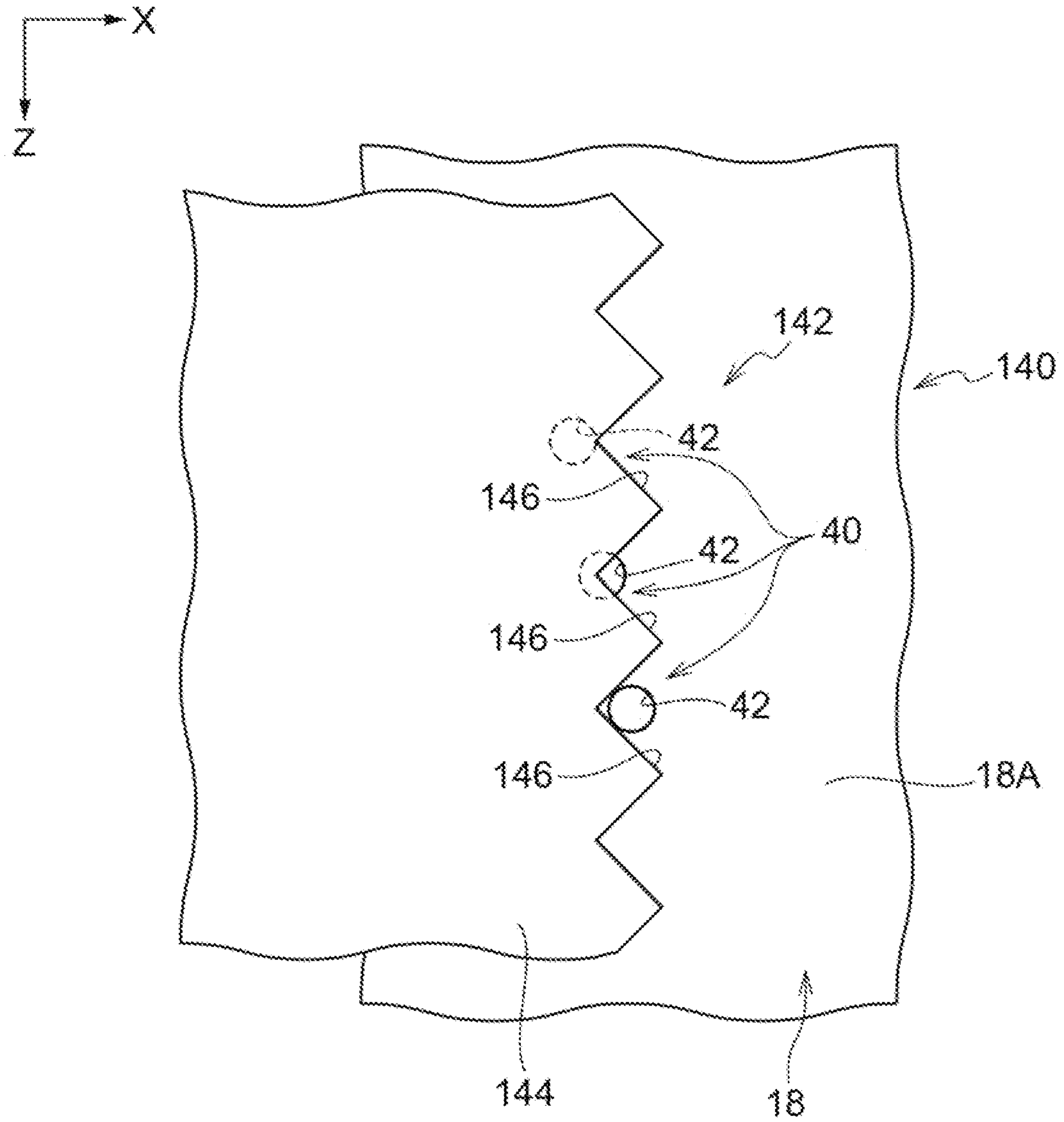
FIG. 17 is a plan view showing a bracket and a to-be-attached part of an attachment structure according to a third embodiment.

As shown in FIG. 17, an attachment structure 140 includes an adjustment part 142 instead of the adjustment part 20 of the attachment structure 10 of the first embodiment. The adjustment part 142 adjusts an attachment position of a bracket 144 to the to-be-attached part 18 by performing fixing using any one of the plurality of (three in the third embodiment) fixing parts 40 arranged by being shifted in the device width direction. The plurality of fixing parts 40 include the plurality of (three in the third embodiment) screw holes 42 provided in the to-be-attached part 18. The plurality of screw holes 42 are arranged at intervals in the device depth direction and are misaligned by a distance smaller than a diameter of the screw hole 42 in the device width direction. The bracket 144 is an example of an attachment member.

In addition, a plurality of recesses 146 corresponding to the positions of the screw holes 42 are provided at an edge portion of the bracket 144 in the device depth direction. The plurality of recesses 146 form, for example, a serrated shape. The screw 44 (see FIG. 5) as an example of an insertion element penetrates one of the plurality of recesses 146 and is fastened in one of the plurality of screw holes 42 of the to-be-attached part 18, and thereby the bracket 144 is fixed to one of the plurality of screw holes 42. Further, other configurations of the attachment structure 140 are similar to those of the attachment structure 10 of the first embodiment.

In the attachment structure 140, the following functions and effects can be obtained with the same configurations as those of the attachment structure 10 of the first embodiment.

Fourth Embodiment

Next, an attachment structure according to a fourth embodiment will be described with reference to FIG. 18. Further, the same components as those of the first to third embodiments are denoted by the same reference numerals, and the description thereof will be omitted.

Figure 18:
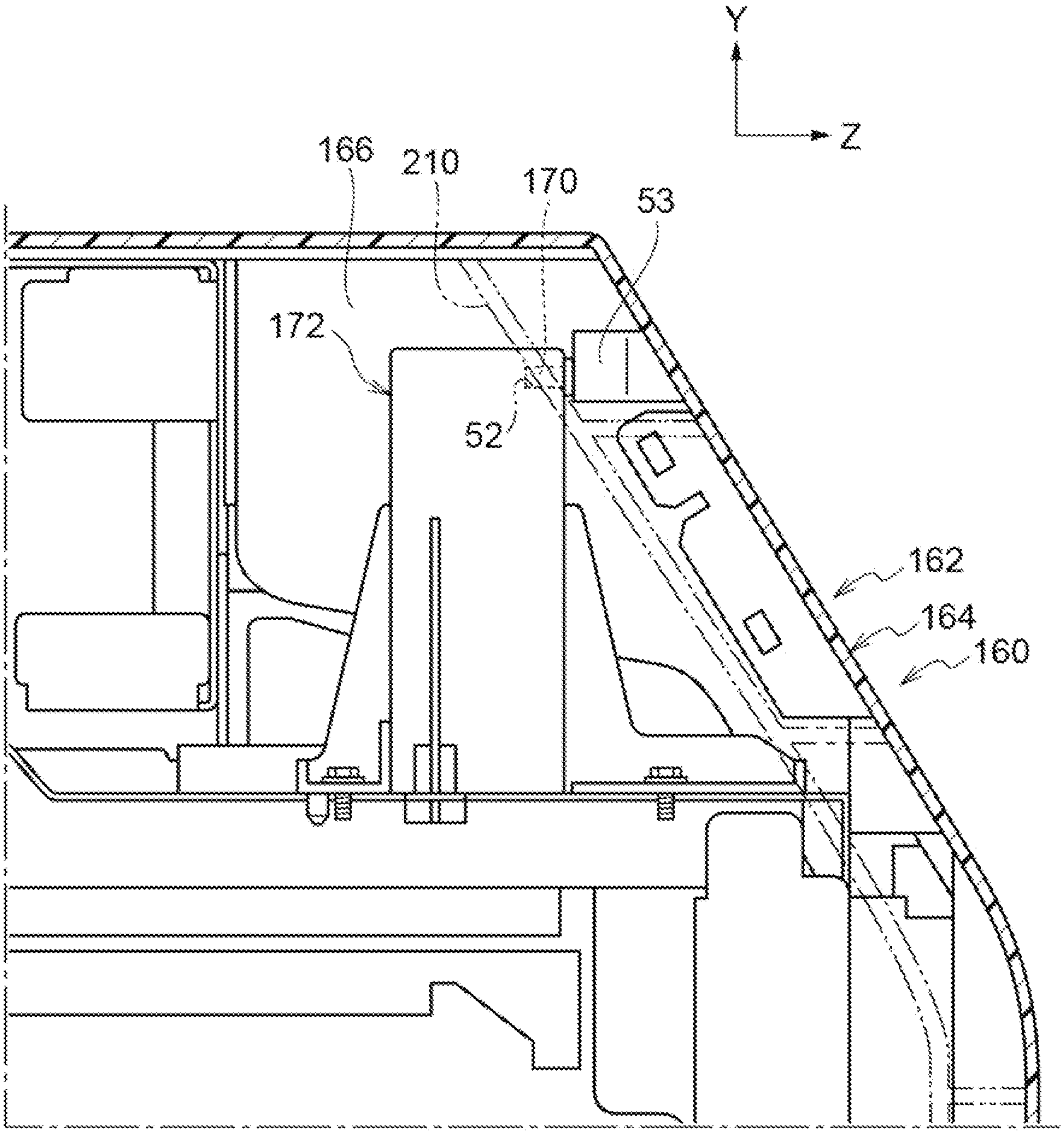
FIG. 18 is a side view showing a state in which an outer cover is positioned at a bracket disposed inside the support part cover of an attachment structure according to a fourth embodiment.

As shown in FIG. 18, an attachment structure 160 includes a support part cover 162 that is divided into an outer cover 164 and an inner cover 166. The outer cover 164 has a boss 170 at a distal end of the projecting portion 53, and the outer cover 164 is positioned at a bracket 172 by inserting the boss 170 into the recess 52 of the bracket 172. The bracket 172 is an example of an attachment member.

In the attachment structure 160, the inner cover 166 is positioned at the outer cover 164. A positioning structure of the inner cover 166 and the outer cover 164 is, for example, a structure in which the positioning structure of the inner cover 26 and the outer cover 24 of the first embodiment (see FIGS. 9 to 14) is reversed.

In addition, stiffness of the outer cover 164 is higher than stiffness of the inner cover 166. Here, "that the stiffness of the outer cover 164 is higher than the stiffness of the inner cover 166" means that the outer cover 164 is less likely to be deformed than the inner cover 166, that is, a load required for deformation is large. For example, in a general outer cover, a rib 210 extending from the outer cover toward the back side in the device depth direction is provided, but in the outer cover 164 of the fourth embodiment, the rib (for example, rib 210 shown in FIG. 18) is not provided at least on a device deep back side of the bracket 172.

In addition, in the attachment structure 160, in a state where the conveyance device 106 (see FIG. 1) covers the upper surface of the support part 104, the outer cover 164 is positioned at the bracket 172, and a position (see the screw 82 in FIG. 8) where the inner cover 166 is fixed to the upper frame (not shown) of the support part 104 is covered with the upper cover 14. Further, other configurations of the attachment structure 160 are similar to those of the attachment structure 10 of the first embodiment.

In the attachment structure 160 described above, the following functions and effects can be obtained in addition to the effects of the same configurations as those of the attachment structure 10 of the first embodiment.

In the attachment structure 160, it is easy to adjust a position of a boundary area between the outer cover 164 and the inner cover 166 as compared with the case where both the outer cover and the inner cover are positioned at the attachment member.

Therefore, in the attachment structure 160, it is possible to place distortion of the inner cover 166 in a region that is unlikely to be seen from the outside, as compared with the case where the position where the inner cover is fixed to the main body portion is exposed to the outside of the upper cover.

OTHERS

In the first to fourth embodiments, the positioning structure of the inner cover and the outer cover can be changed within a range without departing from the technology of the disclosure.

In addition, in the first to third embodiments, the to-be-attached part has the plurality of screw holes and the screw fastened in the screw hole are provided as the adjustment part, but the disclosure is not limited to this configuration. For example, holes may be provided instead of the screw holes, and the insertion element may be fixed in the hole by locking or the like in a state where the insertion element is inserted into the hole. For example, the insertion element may be a pin, and the pin may be fixed in the hole by locking or the like. In addition, the screw hole or the hole instead of the screw hole is not a through-hole but is recessed or a portion including a recess.

In addition, the first to fourth embodiments have the configuration in which the conveyance device is supported on the back side in the device depth direction, but the disclosure is not limited to the configuration. For example, the disclosure also includes a configuration in which the conveyance device is supported at another position on the right side, near the center, or the like in the device width direction. In the configuration in which the conveyance device is supported at the other position on the right side, near the center, or the like in the device width direction, positional misalignment may occur in the depth direction. Therefore, the configuration described above may preferably include an adjustment part that adjusts an attachment position of the attachment member to the to-be-attached part by performing fixing using any one of a plurality of fixing parts disposed by being shifted in a device depth direction. As the adjustment part, for example, a configuration is used in which the configuration of the plurality of fixing parts shifted in the device width direction in the first to third embodiments is changed to the configuration of the plurality of fixing parts shifted in the device depth direction.

In addition, in the first to fourth embodiments, an example has been described in which the conveyance device is rotatable around a shaft disposed on the image formation device main body in the device width direction, but the disclosure is not limited thereto. For example, the conveyance device may be configured not to be rotatable but to be fixed to the image formation device main body.

In addition, in the first to fourth embodiments, the stiffness of the inner cover and the outer cover constituting the support part cover is changed by changing the presence or absence of the rib or the number of ribs, but the disclosure is not limited thereto. For example, the stiffness of the inner cover and the outer cover may be changed by changing thicknesses of the inner cover and the outer cover or changing materials (for example, mixed with glass fibers) of the inner cover and the outer cover.

Further, although the disclosure has been described in detail with reference to specific embodiments, the disclosure is not limited to the embodiments, and it is apparent to those skilled in the art that various other embodiments can be configured within the scope of the disclosure.

The disclosure of Japanese Patent Application No. 2021-047684 is incorporated herein by reference in its entirety.

All of the literatures, patent applications, and technical standards described in this specification are incorporated herein by reference to the same extent that individual literatures, patent applications, and technical standards were specifically and individually indicated to be incorporated by reference.

The invention claimed is:

1. An attachment structure comprising:

a conveyance device provided at a support portion disposed on an upper portion of a recording unit that records an image, the conveyance device conveying an object to be conveyed and reading information;

a support portion cover that is provided at an outer surface of the support portion;

an attachment member that is attached to a to-be-attached portion disposed inside the support portion, and that positions the support portion cover; and an adjustment portion that adjusts an attachment position of the attachment member to the to-be-attached portion by performing fixing using any one of a plurality of fixing portions that are disposed so as to be staggered in a device width direction, wherein the support portion cover is divided into an outer cover that covers a part of a device front surface and an outer side in the device width direction, and an inner cover that is disposed further toward an inner side in the device width direction than the outer cover, and wherein the inner cover is positioned at the attachment member, and the outer cover is positioned at the inner cover.

2. The attachment structure according to claim 1, wherein the plurality of fixing portions have:

a plurality of holes that are provided at the to-be-attached portion and are arranged at intervals in a device depth direction, the plurality of holes being misaligned, by a distance smaller than a diameter of the holes, in the device width direction; and an insertion element that is inserted into one of the plurality of holes to fix the attachment member.

3. The attachment structure according to claim 1, wherein the plurality of fixing portions have:

a plurality of through-holes that are provided at the attachment member and are arranged at intervals in a device depth direction, the plurality of through-holes being misaligned, by a distance smaller than a diameter of the through-holes, in the device width direction; and an insertion element that penetrates one of the plurality of through-holes and is inserted, in the device depth direction, into one of a plurality of holes provided at the to-be-attached portion to fix the attachment member.

4. The attachment structure according to claim 1, wherein a rigidity of the inner cover is higher than a rigidity of the outer cover.

5. The attachment structure according to claim 1, further comprising:

an upper cover that is provided at an outer surface of the conveyance device and is disposed alongside an upper side of the support portion cover, wherein a position at which the outer cover is fixed to a main body portion of the support portion is covered by the upper cover in a state in which an upper surface of the support portion is covered by the conveyance device.

6. The attachment structure according to claim 1, wherein a rigidity of the outer cover is higher than a rigidity of the inner cover.

7. The attachment structure according to claim 6, further comprising:

an upper cover that is provided at an outer surface of the conveyance device and is disposed alongside an upper side of the support portion cover, wherein a position at which the inner cover is fixed to a main body portion of the support portion is covered by the upper cover in a state in which an upper surface of the support portion is covered by the conveyance device.

8. The attachment structure according to claim 4, wherein at least one of the inner cover of the support portion or the outer cover of the support portion cover does not have a rib at least at a back side in a device depth direction of the attachment member.

9. The attachment structure according to claim 1, wherein a lower side of the support portion cover is positioned at a frame disposed inside the support portion cover.

10. An image formation device comprising:

the attachment structure according to claim 1;

a reading unit that reads information on the object to be conveyed which is conveyed by the conveyance device provided at the attachment structure; and an image formation device main body including a recording unit that records information, read by the reading unit, on a recording medium.

11. An attachment structure comprising:

a conveyance device provided at a support portion disposed on an upper portion of a recording unit that records an image, the conveyance device conveying an object to be conveyed and reading information;

a support portion cover that is provided at an outer surface of the support portion;

an attachment member that is attached to a to-be-attached portion disposed inside the support portion, and that positions the support portion cover; and an adjustment portion that adjusts an attachment position of the attachment member to the to-be-attached portion by performing fixing using any one of a plurality of fixing portions that are disposed so as to be staggered in a device width direction, wherein the support portion cover is divided into an outer cover that covers a part of a device front surface and an outer side in the device width direction, and an inner cover that is disposed further toward an inner side in the device width direction than the outer cover, and wherein the outer cover is positioned at the attachment member, and the inner cover is positioned at the outer cover.

12. The attachment structure according to claim 11, wherein the plurality of fixing portions have:

a plurality of holes that are provided at the to-be-attached portion and are arranged at intervals in a device depth direction, the plurality of holes being misaligned, by a distance smaller than a diameter of the holes, in the device width direction; and an insertion element that is inserted into one of the plurality of holes to fix the attachment member.

13. The attachment structure according to claim 11, wherein the plurality of fixing portions have:

a plurality of through-holes that are provided at the attachment member and are arranged at intervals in a device depth direction, the plurality of through-holes being misaligned, by a distance smaller than a diameter of the through-holes, in the device width direction; and an insertion element that penetrates one of the plurality of through-holes and is inserted, in the device depth direction, into one of a plurality of holes provided at the to-be-attached portion to fix the attachment member.

14. The attachment structure according to claim 11, wherein a lower side of the support portion cover is positioned at a frame disposed inside the support portion cover.

15. An image formation device comprising:

the attachment structure according to claim 11;

a reading unit that reads information on the object to be conveyed which is conveyed by the conveyance device provided at the attachment structure; and an image formation device main body including a recording unit that records information, read by the reading unit, on a recording medium.

16. The attachment structure according to claim 11, wherein a rigidity of the inner cover is higher than a rigidity of the outer cover.

17. The attachment structure according to claim 11, wherein a rigidity of the outer cover is higher than a rigidity of the inner cover.

18. The attachment structure according to claim 17, further comprising:

an upper cover that is provided at an outer surface of the conveyance device and is disposed alongside an upper side of the support portion cover, wherein a position at which the inner cover is fixed to a main body portion of the support portion is covered by the upper cover in a state in which an upper surface of the support portion is covered by the conveyance device.

19. An attachment structure comprising:

a conveyance device provided at a support portion disposed on an upper portion of a recording unit that records an image, the conveyance device conveying an object to be conveyed and reading information;

a support portion cover that is provided at an outer surface of the support portion;

an attachment member that is attached to a to-be-attached portion disposed inside the support portion, and positions the support portion cover; and an adjustment portion that adjusts an attachment position of the attachment member to the to-be-attached portion by performing fixing using any one of a plurality of fixing portions that are disposed so as to be staggered in a device depth direction, wherein the support portion cover is divided into an outer cover that covers a part of a device front surface and an outer side in the device width direction, and an inner cover that is disposed further toward an inner side in the device width direction than the outer cover, and wherein the inner cover is positioned at the attachment member, and the outer cover is positioned at the inner cover.

20. An image formation device, comprising:

the attachment structure according to claim 19;

a reading unit that reads information on the object to be conveyed which is conveyed by the conveyance device provided at the attachment structure; and an image formation device main body including a recording unit that records information, read by the reading unit, on a recording medium.

* * * * *